(12) United States Patent
Han et al.

(10) Patent No.: US 11,606,838 B2
(45) Date of Patent: Mar. 14, 2023

(54) ELECTRONIC DEVICE FOR CONTROLLING ESTABLISHMENT OR RELEASE OF COMMUNICATION CONNECTION, AND OPERATING METHOD THEREFOR

(71) Applicant: Samsung Electronics Co., Ltd., Suwon-si (KR)

(72) Inventors: Euibum Han, Suwon-si (KR); Namyong Kang, Suwon-si (KR); Byungsung Kang, Suwon-si (KR); Seongbok Kim, Suwon-si (KR); Chunho Park, Suwon-si (KR); Moohyun Shin, Suwon-si (KR); Kyungjun Lee, Suwon-si (KR); Meekyeong Lee, Suwon-si (KR); Dongsun Lim, Suwon-si (KR); Seokkyu Jang, Suwon-si (KR); Jeonghyeon Yun, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 16/960,862

(22) PCT Filed: Dec. 27, 2018

(86) PCT No.: PCT/KR2018/016767
§ 371 (c)(1),
(2) Date: Jul. 8, 2020

(87) PCT Pub. No.: WO2019/135552
PCT Pub. Date: Jul. 11, 2019

(65) Prior Publication Data
US 2021/0068194 A1 Mar. 4, 2021

(30) Foreign Application Priority Data
Jan. 8, 2018 (KR) .................. 10-2018-0002505

(51) Int. Cl.
*H04W 4/00* (2018.01)
*H04W 76/34* (2018.01)
*H04W 8/08* (2009.01)

(52) U.S. Cl.
CPC ............ *H04W 76/34* (2018.02); *H04W 8/08* (2013.01)

(58) Field of Classification Search
CPC ....... H04W 8/08; H04W 76/00; H04W 76/10; H04W 76/11; H04W 76/15; H04W 76/20;
(Continued)

(56) References Cited

U.S. PATENT DOCUMENTS

2007/0064682 A1* 3/2007 Adams ................ H04M 1/2535
370/352
2007/0140187 A1* 6/2007 Rokusek ................ H04L 67/51
370/338
(Continued)

FOREIGN PATENT DOCUMENTS

KR 10-2015-0026263 A 3/2015
KR 10-2016-0063741 A 6/2016
(Continued)

OTHER PUBLICATIONS

International Search Report dated Mar. 15, 2019 in connection with International Patent Application No. PCT/KR2018/016767, 2 pages.
(Continued)

*Primary Examiner* — Matthew W Genack

(57) ABSTRACT

An electronic device according to various embodiments comprises a communication module, a processor electrically connected to the communication module, and a memory electrically connected to the processor, wherein the memory, when executed, can store instructions for allowing the processor to: establish a first communication connection with a first external electrode device through the communication module; receive, from a server through the communication module, information related to at least one external
(Continued)

electronic device, which is related to a first user account and is registered therewith; receive a command for connecting a second external electronic device of the external electronic devices, of which there is at least one, to the first external electronic device; release the communication connection with the first external electronic device on the basis of the command; and transmit, to the server through the communication module, a request for connecting the second external electronic device and the first external electronic device. Additional various embodiments are possible.

10 Claims, 30 Drawing Sheets

(58) Field of Classification Search
CPC ... H04W 76/30; H04W 76/34; H04M 1/6041; H04M 1/605; H04M 1/6058; H04M 1/6066; H04M 1/6075; H04M 1/6083; H04M 1/72409; H04M 1/724092; H04M 1/724094; H04M 1/724095; H04M 1/724097; H04M 1/724098
See application file for complete search history.

(56) References Cited

U.S. PATENT DOCUMENTS

| | | |
|---|---|---|
| 2014/0037104 A1 | 2/2014 | Seo et al. |
| 2015/0312705 A1 | 10/2015 | Pan et al. |
| 2016/0007240 A1* | 1/2016 | Belghoul .............. H04W 36/14 370/331 |
| 2016/0155420 A1 | 6/2016 | La et al. |
| 2016/0198290 A1 | 7/2016 | Hong et al. |
| 2016/0360341 A1 | 12/2016 | Srivatsa et al. |
| 2016/0366708 A1 | 12/2016 | Yeom et al. |
| 2017/0054787 A1 | 2/2017 | Kwon et al. |
| 2017/0064747 A1 | 3/2017 | Jung et al. |
| 2017/0094396 A1 | 3/2017 | Chandramohan et al. |
| 2017/0231016 A1 | 8/2017 | Park et al. |

FOREIGN PATENT DOCUMENTS

| | | |
|---|---|---|
| KR | 10-2016-0104017 A | 9/2016 |
| KR | 10-2016-0146346 A | 12/2016 |
| KR | 10-2017-0092966 A | 8/2017 |
| KR | 10-1777052 B1 | 9/2017 |
| KR | 10-2017-0140363 A | 12/2017 |

OTHER PUBLICATIONS

Written Opinion of the International Searching Authority dated Mar. 15, 2019 in connection with International Patent Application No. PCT/KR2018/016767, 7 pages.

Korean Intellectual Property Office, "Notification of the Reasons for Rejection" dated Mar. 29, 2022, in connection with Korean Patent Application No. 10-2018-0002505, 13 pages.

* cited by examiner

ELECTRONIC DEVICE FOR CONTROLLING ESTABLISHMENT OR RELEASE OF COMMUNICATION CONNECTION, AND OPERATING METHOD THEREFOR

CROSS-REFERENCE TO RELATED APPLICATIONS

This application is a 371 of International Application No. PCT/KR2018/016767 filed on Dec. 27, 2018, which claims priority to Korean Patent Application No. 10-2018-0002505 filed on Jan. 8, 2018, the disclosures of which are herein incorporated by reference in their entirety.

BACKGROUND

1. Field

Various embodiments relate to an electronic device for controlling establishment or release of a communication connection and an operating method thereof, and more particularly, to an electronic device capable of controlling establishment or release of a communication connection between an electronic device and another electronic device, or controlling establishment or release of a communication connection between another electronic device and still another electronic device, and an operating method thereof.

2. Description of the Related Art

Various communication protocols, such as a Bluetooth standard, which support a direct communication connection between electronic devices at a short distance, have been disclosed. An electronic device may detect other electronic devices by performing a scanning procedure. The electronic device may establish, automatically or based on a user's input, a communication connection with at least one of the other detected electronic devices. For example, if the at least one of the other detected electronic devices is selected automatically or based on the user's input, the electronic device may establish the communication connection with the selected electronic device by performing a communication connection establishment procedure defined in a standard. The electronic device may release the communication connection if a communication connection release input is detected, a communication connection release event is detected, or a communication signal is not received from another electronic device during pre-designated time.

SUMMARY

If an electronic device and a first external electronic device establish a communication connection, a user may want to connect the first external electronic device to a second external electronic device. Alternatively, if the first external electronic device and the second external electronic device establish a communication connection with each other, the user may want to connect the first external electronic device to the electronic device. In this case, the user may control to release an existing communication connection by manipulating electronic devices which are connected already, and to establish a communication connection by manipulating electronic devices for which new communication connections are intended. An electronic device and an operating method thereof according to various embodiments may establish or release a communication connection between the electronic device and each of a plurality of electronic devices. An electronic device and an operating method thereof according to various embodiments may control a first external electronic device which is currently connected to the electronic device to establish a communication connection with a second external electronic device. An electronic device and an operating method thereof according to various embodiments may control one of a first external electronic device and a second external electronic device which are currently connected to each other to establish a communication connection with the electronic device.

According to various embodiments, an electronic device is provided, and the electronic device includes a communication module, a processor which is electrically connected to the communication module, and a memory which is electrically connected to the processor. The memory may store instructions that cause, when executed, the processor to: establish a first communication connection with a first external electronic device through the communication module, receive, from a server through the communication module, information related to at least one external electronic device which is registered in relation to a first user account, receive a command to connect a second external electronic device among the at least one external electronic device to the first external electronic device, release the first communication connection with the first external electronic device based on the command, and transmit, to the server through the communication module, a communication request between the second external electronic device and the first external electronic device.

According to various embodiments, an electronic device is provided, and the electronic device includes a display device, a communication module, a processor which is electrically connected to the communication module, and a memory which is electrically connected to the processor. The memory may store instructions that cause, when executed, the processor to: receive, from a server through the communication module, information related to at least one external electronic device which is registered in relation to a first user account, display that a first external electronic device among the at least one external electronic device establishes a second communication connection with a second external electronic device among the at least one external electronic device based on the information related to the at least one external electronic device which is registered in relation to the first user account, and receive a command to connect the first external electronic device to the electronic device, transmit, to the server through the communication module, a release request for the second communication connection between the first external electronic device and the second external electronic device, and establish a first communication connection with the first external electronic device upon receiving, through the communication module, information indicating that the second communication connection between the first external electronic device and the second external electronic device is released.

According to various embodiments, an electronic device is provided, and the electronic device includes a communication module, a processor which is electrically connected to the communication module, and a memory which is electrically connected to the processor. The memory may store instructions that cause, when executed, the processor to: transmit, to a server, information about a state of the electronic device using a first user account, receive, from the server, a communication connection command with a first external electronic device, and establish a second communication connection with the first external electronic device based on the communication connection command.

According to various embodiments, an electronic device and an operating method thereof capable of establishing or releasing a communication connection between the electronic device and each of a plurality of electronic devices may be provided. Accordingly, even if only the electronic device is manipulated without manipulation of a second external electronic device, a communication connection may be established between a first external electronic device which is currently connected to the electronic device and the second external electronic device. In addition, even if only the electronic device is manipulated without manipulation of the first external electronic device or the second external electronic device, a communication connection between one of the first external electronic device and the second external electronic device which are currently connected to each other and the electronic device may be established.

DETAILED DESCRIPTION

Figure 1:
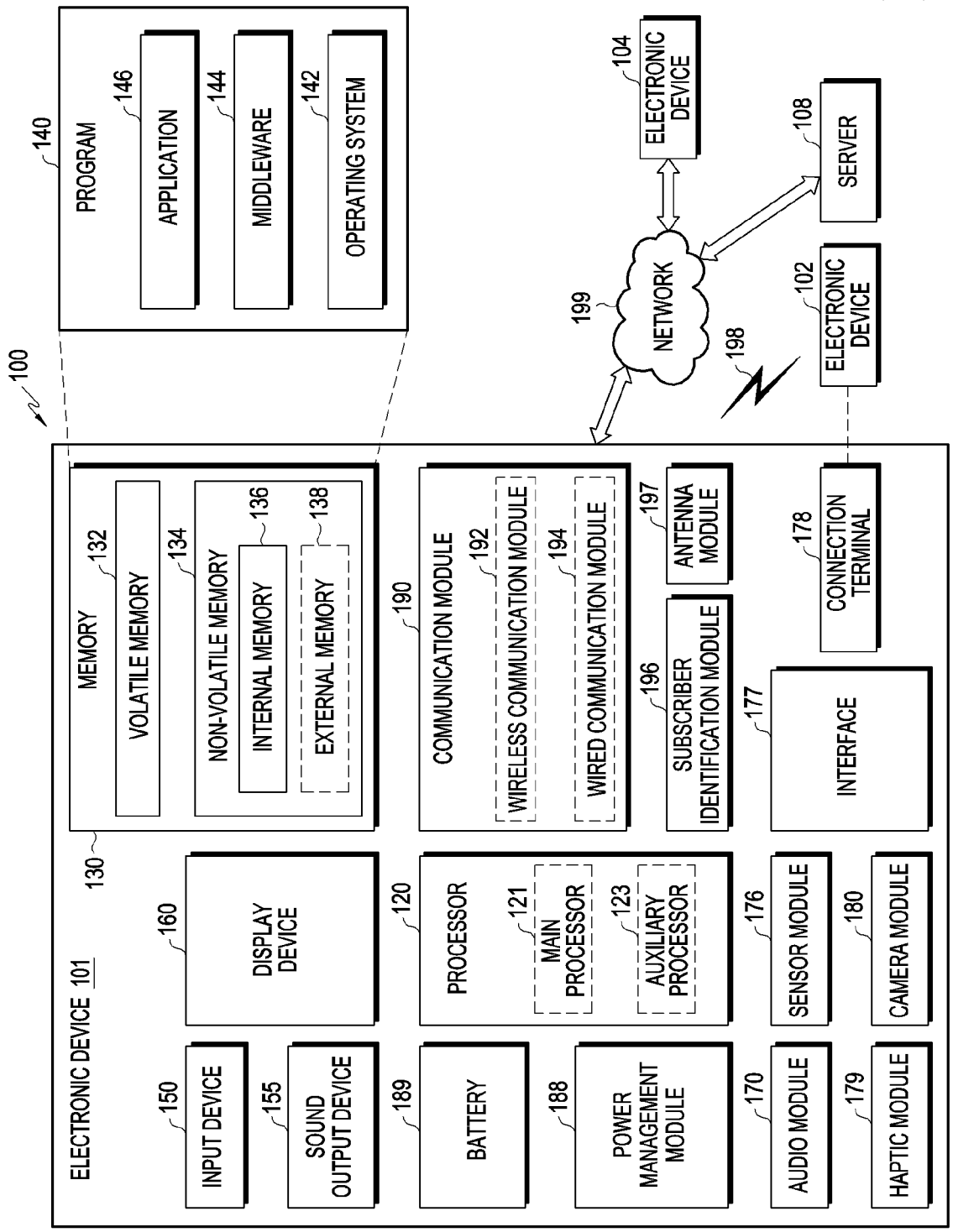
FIG. 1 illustrates a block diagram of a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may acquire the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
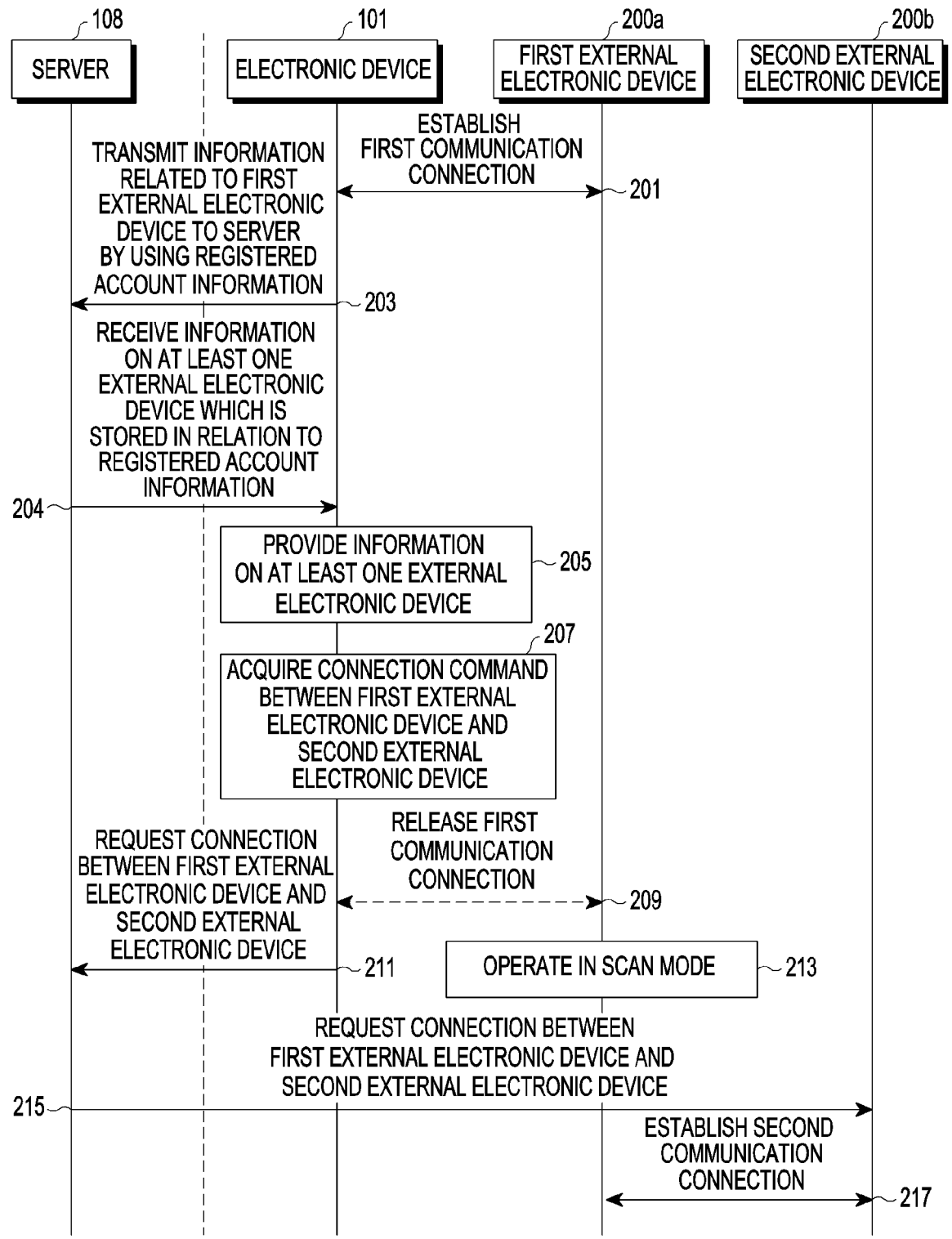
FIG. 2 illustrates a flowchart for describing an operating method of an electronic device according to various embodiments.
Figure 6:
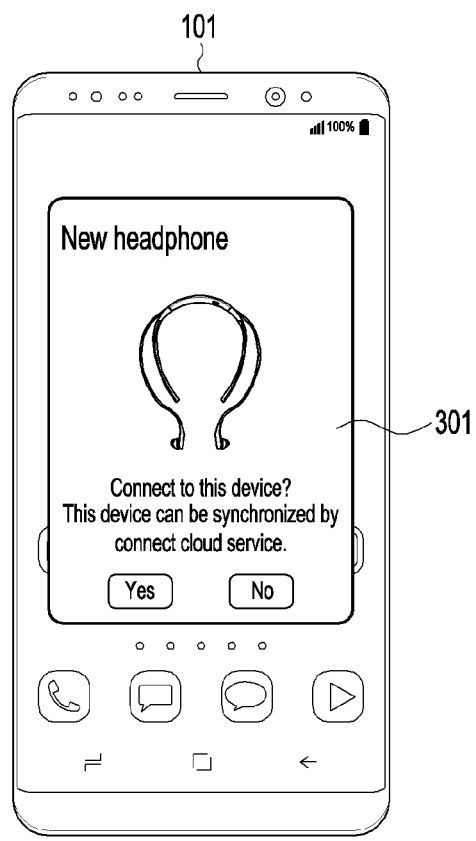
FIG. 6 illustrates an example of a screen displayed by an electronic device according to various embodiments.
Figure 7:
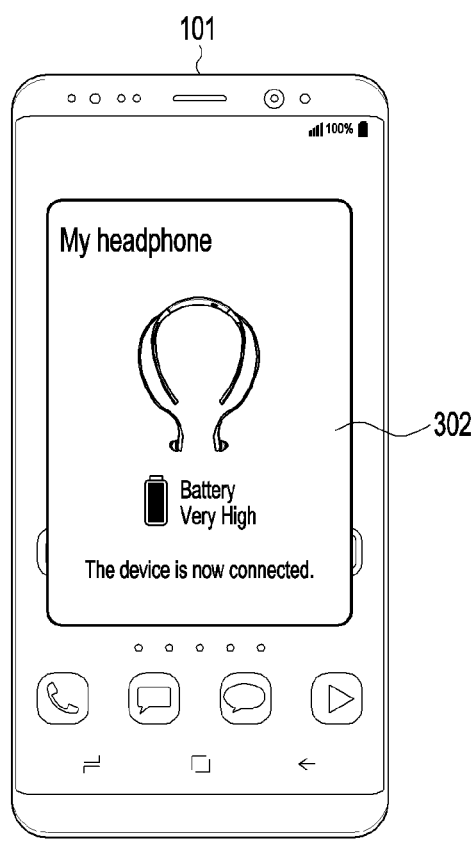
FIG. 7 illustrates another example of a screen displayed by an electronic device according to various embodiments.
Figure 8:
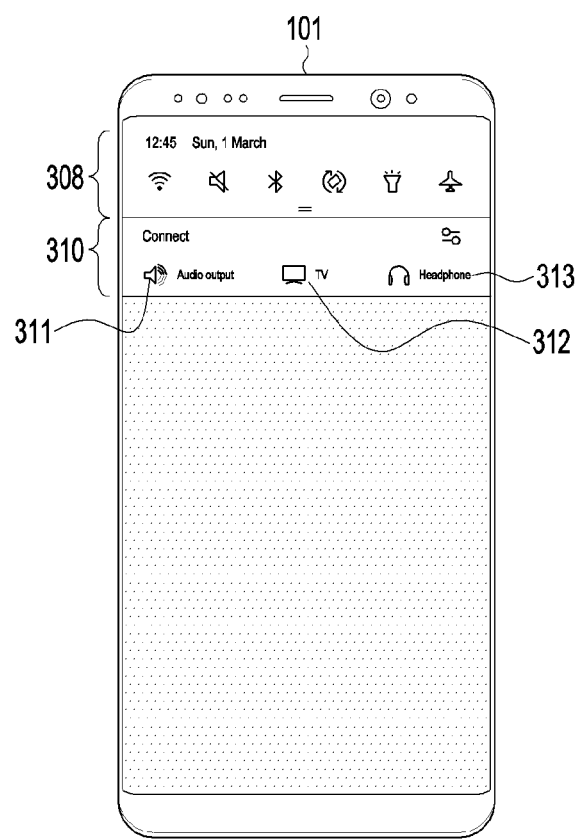
FIG. 8 illustrates still another example of a screen displayed by an electronic device according to various embodiments.
Figure 9:
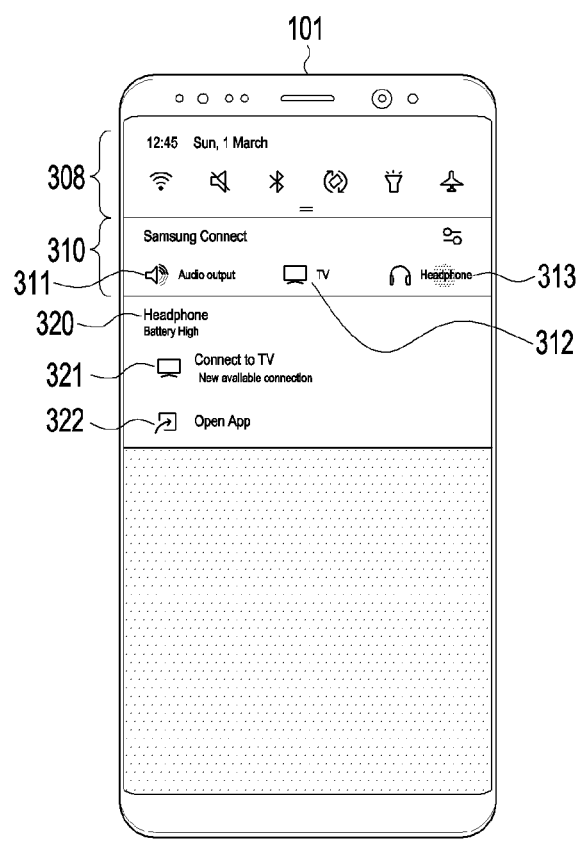
FIG. 9 illustrates still another example of a screen displayed by an electronic device according to various embodiments.

FIG. 2 illustrates a flowchart for describing an operating method of an electronic device according to various embodiments. An embodiment of FIG. 2 will be described in more detail with reference to FIGS. 6 to 9. FIG. 6 illustrates an example of a screen displayed by an electronic device according to various embodiments. FIG. 7 illustrates another example of a screen displayed by an electronic device according to various embodiments. FIG. 8 illustrates still another example of a screen displayed by an electronic device according to various embodiments. FIG. 9 illustrates still another example of a screen displayed by an electronic device according to various embodiments.

According to various embodiments, in operation 201, an electronic device 101 and a first external electronic device 200a may establish a first communication connection. For example, the electronic device 101 may establish the first communication connection with the first external electronic device 200a based on a Bluetooth standard. The electronic device 101 or the first external electronic device 200a may detect a counterpart device which is within a communication range by performing a device discovery procedure. For example, the first external electronic device 200a may perform an inquiry scan, and the electronic device 101 may transmit an ID packet to the first external electronic device 200a. The first external electronic device 200a may transmit a response to the ID packet, so the electronic device 101 may recognize the first external electronic device 200a. In this document, the fact that the electronic device 101 may perform a specific operation may be understood as the fact that a processor 120 performs the specific operation. Alternatively, the fact that the electronic device 101 may perform the specific operation may be understood as the fact that the processor 120 controls a hardware included in the electronic device 101 or hardware external to the electronic device 101 to perform the specific operation. Alternatively, the fact that the electronic device 101 may perform the specific operation may be understood as the fact that instructions are stored in a memory 130 to cause at least one of the processor 120 or hardware to perform the specific operation.

Alternatively, the electronic device 101 may recognize the first external electronic device 200a using, for example, a wireless communication (e.g., a Bluetooth low energy (BLE) communication). The first external electronic device 200a may transmit an advertising signal to the surroundings in a multicast scheme or a broadcast scheme. The advertising signal may be a signal for transmitting information related to a connection or an account (e.g., pairing) to an unspecified peripheral electronic device (e.g., the electronic device 101) using the wireless communication (e.g., the BLE communication). For example, the advertising signal may include at least one of identification information of the first external electronic device 200a (hereinafter, device identification information), a user's account information (hereinafter, user account information), information about whether the first external electronic device 200a is currently paired with another device (hereinafter, current pairing information), a list of previously paired devices (hereinafter, a pairing list), information about devices that may be paired simultaneously (hereinafter, simultaneous pairing information), transmit power (tx power), a sensing area, or information about a remaining battery (hereinafter, battery state information). The first external electronic device 200a may generate the advertising signal according to a designated condition. For example, if power is supplied, the first external electronic device 200a may output the advertising signal based on at least one of a designated time period or a user's input. If the advertising signal is received, the electronic device 101 may output a user interface for a connection on a display device 160. The electronic device 101 may output the user interface according to various conditions based on information included in the advertising signal. For example, the user interface may include an image which corresponds to the first external electronic device 200*a*. For example, the electronic device 101 may display a user interface 301 as shown in FIG. 6. The user interface 301 may include a name of the first external electronic device 200*a*, an image which corresponds to a shape, information about a connection of the first external electronic device 200*a*, and a button for selecting whether to connect to the first external electronic device. Here, the image which corresponds to the shape may include an image of an actual product, for example, an image that copies the actual product as shown in FIG. 6. For example, the user interface 301 may include device recognition information (e.g., a headphone), and the device recognition information may be a part displaying a result of recognizing an external electronic device in the electronic device 101. The device recognition information may indicate whether or not the electronic device 101 has previously been paired with an external electronic device, or may be displayed based on a user account. If the button corresponding to the connection is selected, the electronic device 101 may establish a first communication connection with the first external electronic device 200*a*, and may display a graphic user interface 302 indicating that a communication connection is established as shown in FIG. 7. If the electronic device 101 has a history of being previously paired with the external electronic device, the electronic device 101 may display a user interface reflecting the previously paired history when detecting the external electronic device.

The electronic device 101 may detect a plurality of external electronic devices. The electronic device 101 may display a graphic user interface capable of selecting at least one of the detected plurality of external electronic devices, and may establish a communication connection with an external electronic device selected by a user. For example, if the first external electronic device 200*a* is selected, the electronic device 101 and the first external electronic device 200*a* may perform procedures defined in the Bluetooth standard such as a procedure of establishing a link, a procedure of establishing a channel, a procedure of establishing a service discover session, a procedure of releasing a channel, and/or the like, so the first communication connection may be established.

After the first communication connection is established, the electronic device 101 may transmit and receive data with the first external electronic device 200*a*. For example, if the first external electronic device 200*a* is a headphone, the electronic device 101 may transmit audio data to the first external electronic device 200*a*, and the first external electronic device 200*a* may play back the received audio data. A process in which the electronic device 101 and the first external electronic device 200*a* establish a Bluetooth-based communication connection follows a general standard procedure, and a detailed description thereof will be omitted herein. Meanwhile, the Bluetooth-based communication connection is merely exemplary, and the electronic device 101 according to various embodiments may establish a communication connection between the electronic device 101 and the first external electronic device 200*a* based on various communication schemes as well as Bluetooth.

According to various embodiments, the electronic device 101 may transmit, to a server 108, information related to the first external electronic device 200*a* using registered account information in operation 203. The electronic device 101 may store and execute an application capable of managing or controlling electronic devices which are connected in relation to a specific account. For example, the application may support a function of displaying at least one IoT device registered in relation to the specific account, and transmitting, to a specific IoT device, a control command for the specific IoT device if the control command for the specific IoT device is received. More specifically, when a control command is input from any one electronic device through an application, the control command may be transmitted to a server, and the server may transmit the control command to a controlled electronic device which corresponds to the control command. So, the controlled electronic device may operate according to the control command input to the electronic device. Accordingly, a user of the electronic device 101 may control an external electronic device by inputting a control command through the electronic device 101 without directly controlling the external electronic device. The electronic device 101 may transmit, to the server 108 (e.g., a cloud server, an account management server, or an IoT server, etc.), information about the first external electronic device 200*a* connected to the electronic device 101. That is, the electronic device 101 may register the first external electronic device 200*a* in a first user account. So, even if the first external electronic device 200*a* is an electronic device which may not access a web and supports only a short-range communication, the first external electronic device 200*a* may be registered in the first user account by the electronic device 101. For example, the electronic device 101 may transmit, to the server 108, at least part of information about the first external electronic device 200*a* identified during a communication connection establishment process. For example, the electronic device 101 may transmit, to the server 108, at least part of information received from the first external electronic device 200*a* after the communication connection. The electronic device 101 may transmit, to the server 108, information indicating that the communication connection is established between the first external electronic device 200*a* and the electronic device 101. So, another electronic device which accesses the first user account may identify that the electronic device 101 is connected with the first external electronic device 200*a*. The electronic device 101 may update information about the first external electronic device 200*a* into an internal resource, and transmit the corresponding information to the server 108 or another electronic device so that the other electronic device may identify the corresponding information. If the electronic device 101 is connected with the first external electronic device 200*a* for the first time, the electronic device 101 may transmit, to the server 108, at least one of the information about the first external electronic device 200*a* or state information of the first external electronic device 200*a*. If the electronic device 101 has a history of being connected to the first external electronic device 200*a*, the electronic device 101 may transmit, to the server 108, the state information of the first external electronic device 200*a*. Information which the first external electronic device 200*a* stores in the internal resource in relation to the first external electronic device 200*a* may be at least partially the same as information transmitted to the server 108. The server 108 may update state information to devices having the same account based on transmitted information related to a connection. So, another electronic device which accesses through a first user account may display a user interface indicating that the electronic device 101 and the first external electronic device 200*a* are connected. In addition, the other electronic device which accesses through the first user account may display a user interface including the information about the first external electronic device 200a. For example, a second external electronic device 200b may identify through information from the server 108 that the electronic device 101 and the first external electronic device 200a establish a communication connection. The electronic device 101 and the second external electronic device 200b may be registered in the same user account in advance. In addition, the first external electronic device 200a may be further registered in the same user account later. Here, the same user account may mean one specific user account, or may mean a plurality of user accounts of which authority is delegated. For example, release or establishment of a communication connection among electronic devices registered in relation to a plurality of user accounts included in a family group may be controlled. The second external electronic device 200b may display at least one of the information about the first external electronic device 200a or information indicating that the first external electronic device 200a establishes a communication connection with the electronic device 101. The electronic device 101 may allocate a resource therein to allow another electronic device which is related to the server 108 which corresponds to a user account to read or write the corresponding resource, and identify a resource update. If a communication with the first external electronic device 200a is connected, the electronic device 101 may update information about a connected device to an internal resource thereby another electronic device may identify the information about the connected device. Meanwhile, the electronic device 101 may receive, through the server 108, information about another external electronic device which corresponds to the first user account, and this will be described later in more detail.

In operation 204, the electronic device 101 may receive information about at least one external electronic device stored in relation to registered account information. For example, it will be assumed that the electronic device 101 and the second external electronic device 200b are registered in advance in the server 108 in relation to the first user account. As described above, the electronic device 101 may transmit, to the server 108, the information about the first external electronic device 200a, and the server 108 may register the first external electronic device 200a in relation to the first user account. The server 108 may transmit, to the electronic device 101, the information about the at least one external electronic device related to the first user account, for example, information about the second external electronic device 200b and the first external electronic device 200a. Although not shown, the server 108 may transmit, to the second external electronic device 200b, the information about the at least one external electronic device related to the first user account, for example, information about the electronic device 101 and the first external electronic device 200a.

In operation 205, the electronic device 101 may provide information about at least one external electronic device. For example, the electronic device 101 may display a screen as shown in FIG. 8. The electronic device 101 may display an icon 308 displaying at least one state on a notification bar. The electronic device 101, based on the information about the at least one electronic device received from the server 108, may display information 310 about at least one of an electronic device which is connected through an account or an electronic device which is connected through a short-range communication. Meanwhile, if the electronic device 101 performs communication with the second external electronic device 200b without passing through the server 108, the electronic device 101 may display at least part of the information 310 based on information which is received directly from the second external electronic device 200b.

The electronic device 101 may receive at least one of device information or state information of an external electronic device. The electronic device 101 may receive, for example, at least one of a name, a MAC address, information indicating a type, some or all of advertising information, or update time of the external electronic device. Upon detecting various conditions such as a case of logging in through an application, a case of updating information to a server, a case of running the application, or a case of connecting to a new device, etc., the electronic device 101 may receive, from the server 108, at least one of device information or state information of the external electronic device, and there is no limitation on a reception condition.

In various embodiments, an electronic device which is connected through a short-range communication (e.g., the first external electronic device 200a) may also be processed as an electronic device which is connected through an account. The electronic device 101 may display information about at least one of an electronic device related to a user account or the electronic device connected through the short-range communication. For example, as shown in FIG. 8, the electronic device 101 may display an icon 313 which corresponds to the first external electronic device 200a and an icon 312 which corresponds to the second external electronic device 200b. The first external electronic device 200a may display a name of a corresponding electronic device together with the icon 312. In various embodiments, the electronic device 101 may display at least one of an icon and a name of an electronic device, and those skilled in the art will readily understand that there is no limitation on information for identifying the electronic device. The electronic device 101 may display an icon 311 indicating that audio is output. As described later in more detail, if the icon 311 is designated, the electronic device 101 may provide a user interface capable of changing an electronic device to which audio is output. In various embodiments, the electronic device 101 may display information about all electronic devices which are registered in relation to a user account, and the information is received from the server 108. In another embodiment, the electronic device 101 may display electronic devices currently located around the electronic device 101 among registered electronic devices. For example, the electronic device 101 may receive a BLE-based advertisement signal from the second external electronic device 200b, and may display the icon 312 which corresponds to the second external electronic device 200b and the icon 311 indicating that audio is output. Alternatively, the electronic device 101 may measure a current location of the electronic device 101 and display information about electronic devices which are determined to be located around the electronic device 101 based on the location. The electronic device 101 may display information about electronic devices which are determined to be located around the electronic device 101 among information about electronic devices which is stored inside the electronic device 101 (e.g., the memory 130) or which is received from the server 108. Alternatively, the electronic device 101 may display an external electronic device capable of communication. Alternatively, the electronic device 101 may select whether to display the external electronic device in consideration of capability of the external electronic device. In FIG. 8, although the electronic device 101 visually displays information about an electronic device to which the electronic device 101 may connect or an electronic device to which the electronic device 101 is connecting, this is merely exemplary, and the electronic device 101 may provide, through various output schemes (e.g., a voice output), the information about the electronic device to which the electronic device 101 may connect or the electronic device to which the electronic device 101 is connecting.

In operation 207, the electronic device 101 may acquire a connection command between the first external electronic device 200a and the second external electronic device 200b. For example, when it is detected that the icon 313 which corresponds to the first external electronic device 200a is selected on a screen in FIG. 8, the electronic device 101 may display information 320 about devices which may be connected with the first external electronic device 200a as illustrated in FIG. 9. For example, the electronic device 101 may display an icon 321 which corresponds to a command for connecting the first external electronic device 200a to the second external electronic device 200b and an application execution icon 322. Upon detecting that the icon 321 which corresponds to the command for connecting to the second external electronic device 200b is selected, the electronic device 101 may perform a subsequent procedure for connecting the first external electronic device 200a to the second external electronic device 200b, and this will be described later in more detail. Accordingly, without directly manipulating the second external electronic device 200b, a user may input a connection command between the first external electronic device 200a and the second external electronic device 200b using the electronic device 101. The electronic device 101 may display an external electronic device which may be connected with the first external electronic device 200a, and for example, may display only an external electronic device within a communication range or a designated range. According to various embodiments, when the application execution icon 322 is selected, the electronic device 101 may display an execution screen of an application for at least one of registration or control of a registered electronic device on an entire screen.

In various embodiments, as described above, the electronic device 101 may display only the external electronic device within the designated range or the communication range. In this case, the electronic device 101 may determine whether the external electronic device is within the above-described range based on a BLE communication, and the electronic device 101 may operate as a BLE scanner. The second external electronic device 200b may operate, for example, as a BLE advertiser. That is, the electronic device 101 may receive an advertising signal from the second external electronic device 200b, and accordingly, identify that the second external electronic device 200b is included in the designated range or the communication range to display the second external electronic device 200b.

The electronic device 101 may also register in the server 108 that the second external electronic device 200b is included in the designated range, so the second external electronic device 200b may identify that the electronic device 101 is within a designated range which is based on the second external electronic device 200b. The second external electronic device 200b may also display the electronic device 101 as an external electronic device which is located within the designated range.

In one embodiment, the electronic device 101 may operate as a BLE advertiser, and the second external electronic device 200b may operate as a BLE scanner. In this case, the second external electronic device 200b may determine whether the electronic device 101 is within a designated range, and may transmit information indicating that the second external electronic device 200b is within the designated range to the server 108 based on the determination result. The server 108 may transmit, to the electronic device 101, information indicating that the second external electronic device 200b is within the designated range, and the electronic device 101 may identify that the second external electronic device 200b is within in the designated range or a communication range to display the second external electronic device 200b.

Upon acquiring the connection command between the first external electronic device 200a and the second external electronic device 200b, in operation 209, the electronic device 101 may release the first communication connection with the first electronic device 200a. In various embodiments, the electronic device 101 may release the first communication connection after transmitting an address (e.g., a MAC address) of the second external electronic device 200b to the first external electronic device 200a. In this case, the first external electronic device 200a may later establish a communication connection with the second external electronic device 200b using the received address of the second external electronic device 200b.

In operation 211, the electronic device 101 may request, from the second external electronic device 200b through the server 108, a connection between the first external electronic device 200a and the second external electronic device 200b. That is, the electronic device 101 may first transmit, to the server 108, a connection request between the first external electronic device 200a and the second external electronic device 200b, and the server 108 may transmit the connection request to the second external electronic device 200b. The electronic device 101 may transmit, to the server 108, at least part of information required for establishing a communication connection between the first external electronic device 200a and the second external electronic device 200b. For example, the electronic device 101 may transmit, to the server 108, at least one of a command related to a connection, information related to the first external electronic device 200a (e.g., a name, a MAC address, and information indicating a type, or some or all of advertising information of the first external electronic device 200a), or information related to the second external electronic device 200b (e.g., a name, a MAC address, and information indicating a type, or some or all of advertising information of the second external electronic device 200b). The server 108 may transmit, to the second external electronic device 200b, the information related to the first external electronic device 200a and a command related to a connection based on the information related to the second external electronic device 200b. The electronic device 101 may transmit, to the server 108, an icon index, a supported service, or a connection protocol. Here, the supported service may refer to a profile in Bluetooth, and the supported service may be different according to the connection protocol. The connection protocol may include Bluetooth, BLE, WiFi, WiFi P2P, and/or the like.

If the first external electronic device 200a (e.g., a WiFi speaker) accesses the server 108 through an Internet, the server 108 may transmit a connection request to the first external electronic device 200a. Alternatively, the electronic device 101 may release a communication connection after commanding the first external electronic device 200a to connect a communication with the second external electronic device 200b.

In operation 213, the first external electronic device 200a may operate in a page scan mode after the first communication connection is released. The first external electronic device 200a may be configured to automatically operate in the page scan mode after a communication connection is released, or operate in the page scan mode after a communication signal intended to operate in the page scan mode is received from the electronic device 101 and then the communication connection is released. In various embodiments, after entering the page scan mode, the first external electronic device 200a may adjust at least one of a window size of a page scan, an interval between windows of the page scan, or an applied interval for a current which is applied for signal reception.

In operation 215, the server 108 may request, from the second external electronic device 200b, a connection between the first external electronic device and the second external electronic device 200b. For example, the server 108 may transmit, to the second external electronic device 200b, connection information about the first external electronic device 200a (e.g., a MAC address, class of device (COD) information, and device name information). In more detail, the second external electronic device 200b may receive information about the first external electronic device 200a as a connection target, and establish a connection communication with a device such as a headset (e.g., the first external electronic device 200a) which operates in the page scan mode using the corresponding information.

In operation 217, the second external electronic device 200b may establish a second communication connection with the first external electronic device 200a. The second external electronic device 200b may transmit an ID packet for a Bluetooth connection based on the received information about the first external electronic device 200a. Upon receiving a response from the first external electronic device 200a, the second external electronic device 200b may establish the second communication connection with the first external electronic device 200a. So, a communication connection between the first external electronic device 200a and the second external electronic device 200b may be established only by manipulation of the electronic device 101. In various embodiments, the second external electronic device 200b may display that the second external electronic device 200b is connected with the first external electronic device 200a. The electronic device 101 may display state information indicating that the first external electronic device 200a is connected with the second external electronic device 200b.

Figure 3:
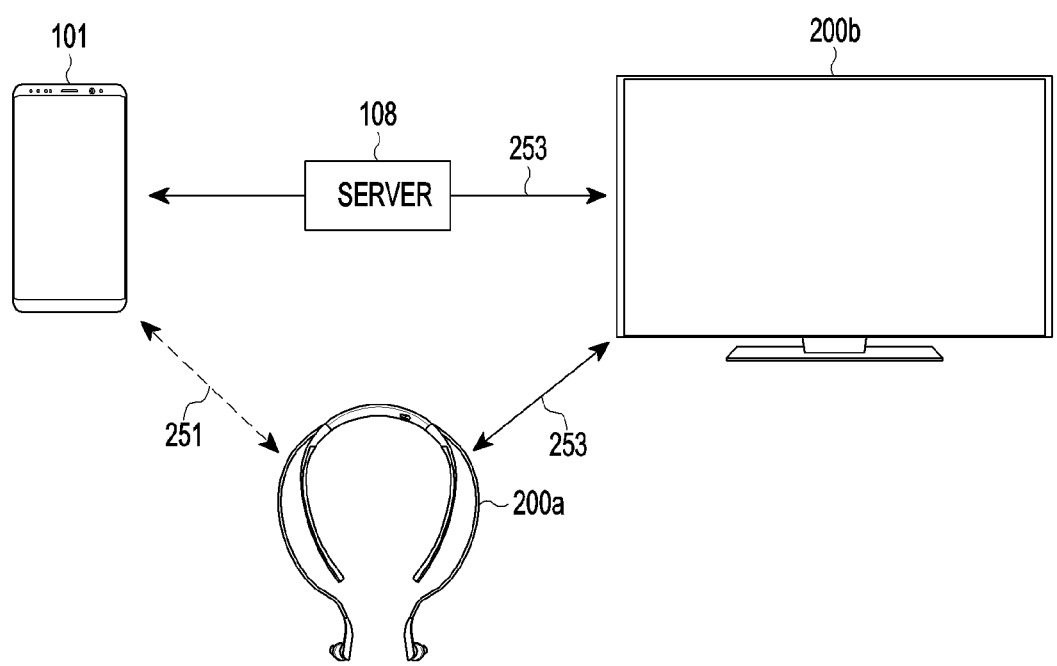
FIG. 3 illustrates a diagram of an electronic device and an external electronic device according to various embodiments.

FIG. 3 illustrates a diagram of an electronic device and an external electronic device according to various embodiments.

As illustrated in FIG. 3, an electronic device 101 may be implemented as, for example, a communication terminal such as a smart phone, a first external electronic device 200a may be implemented as, for example, a headphone which supports a short-range communication (e.g., Bluetooth, BLE, WiFi, WiFi P2P, or IrDA, etc.), and a second external electronic device 200b may be implemented as, for example, a TV. The electronic device 101 may establish a communication connection with the first external electronic device 200a to transmit and receive data. For example, a user may wear the first external electronic device 200a, and the first external electronic device 200a may play back audio data received from the electronic device 101. Meanwhile, the audio data is merely exemplary. If a communication connection target is a TV, multimedia content data may be transmitted and received, and there is no limitation on a type of data transmitted and received. A user may want to listen to, through the first external electronic device 200a, audio data from a TV 200b, not the audio data from the electronic device 101. In an existing Bluetooth connection scheme, the user needs to first release a communication connection between the electronic device 101 and the first external electronic device 200a, and manipulate the second external electronic device 200b to connect the first external electronic device 200a and the second external electronic device 200b. According to various embodiments, the electronic device 101 may control a connection between the first external electronic device 200a and the second external electronic device 200b. The electronic device 101 may detect the second external electronic device 200b, and display the second external electronic device 200b on the electronic device 101. Upon receiving a connection command between the first external electronic device 200a and the second external electronic device 200b from the user, the electronic device 101 may release a communication connection 251 with the first external electronic device 200a. In addition, the electronic device 101 may transmit, to a server 108, a connection request between the first external electronic device 200a and the second external electronic device 200b. The server 108 may transmit the connection request to the second external electronic device 200b, and the second external electronic device 200b may establish a communication connection 253 with the first external electronic device 200a. So, the first external electronic device 200a may receive audio data from the second external electronic device 200b to play back the audio data.

Figure 4:
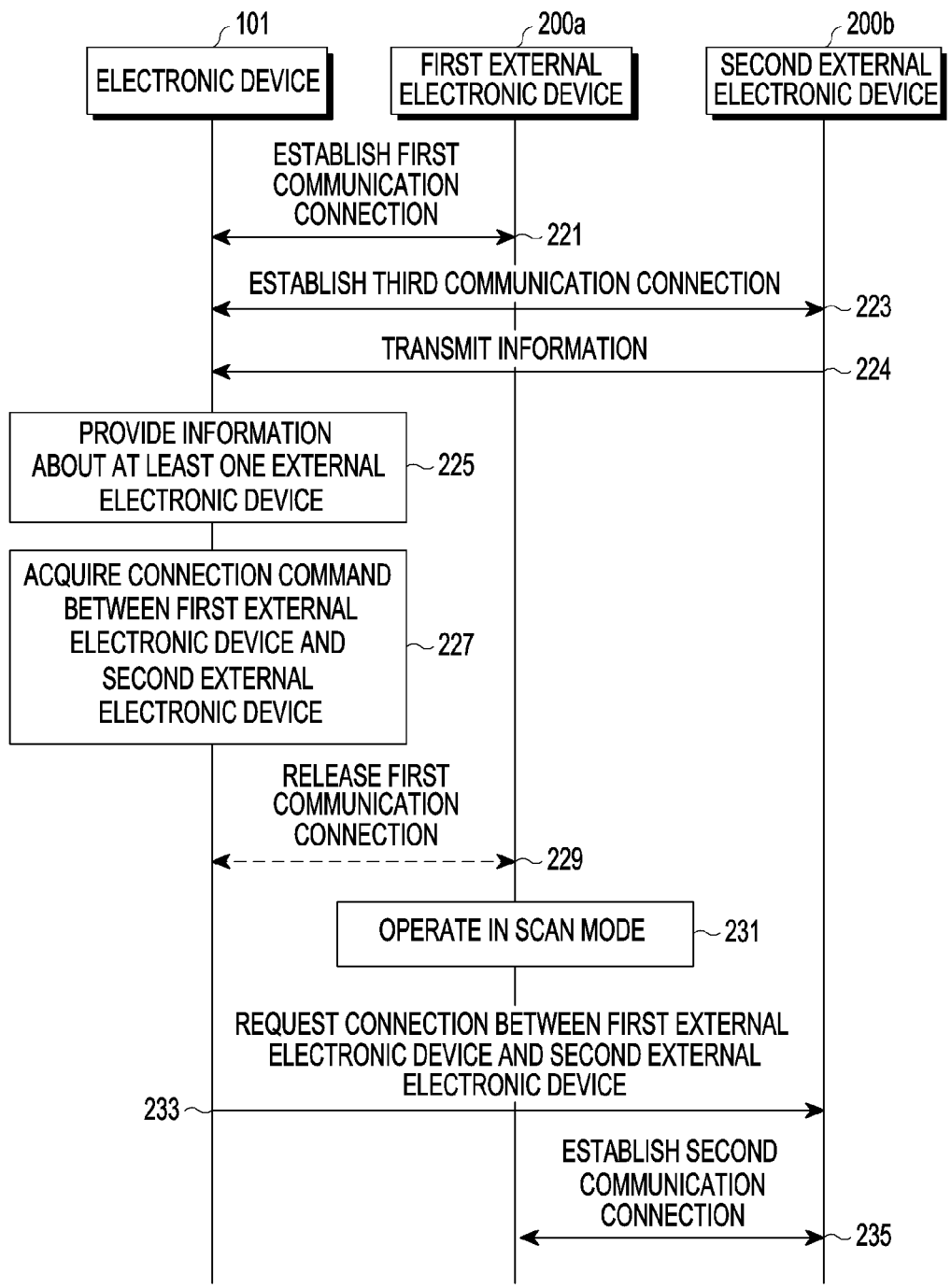
FIG. 4 illustrates a flowchart for describing an operating method of an electronic device according to various embodiments.

FIG. 4 illustrates a flowchart for describing an operating method of an electronic device according to various embodiments. A description of a part which overlaps with FIG. 2 will be briefly described.

In various embodiments, in operation 221, an electronic device 101 may establish a first communication connection with a first external electronic device 200a. In operation 223, the electronic device 101 may establish a third communication connection with a second external electronic device 200b. For example, the electronic device 101 may establish the third communication connection with the second external electronic device 200b through a short-range communication (e.g., Bluetooth, BLE, WiFi, WiFi P2P, or IrDA, etc.). The second external electronic device 200b may transmit, to the electronic device 101, information about the second external electronic device 200b through the established third communication connection. That is, the electronic device 101 may perform a communication with the second external electronic device 200b without passing through a server 108. In operation 225, the electronic device 101 may provide information about at least one external electronic device (e.g., the second external electronic device 200b) through a user interface. In operation 227, the electronic device 101 may acquire a connection command between the first external electronic device 200a and the second external electronic device 200b. The electronic device 101 may release the first communication connection in operation 229. In operation 231, the first external electronic device 200a may operate in a page scan mode. In operation 233, the electronic device 101 may directly request, from the second external electronic device 200b through the third communication connection, a connection between the first external electronic device 200a and the second external electronic device 200b. In operation 235, the second external electronic device 200b may establish a second communication connection with the first external electronic device 200a. The second external electronic device 200b may establish the third communication connection with the electronic device 101 and the second communication connection with the first external electronic device 200a according to one communication scheme, that is, the second external electronic device 200*b* may perform multi-pairing. In another embodiment, the second external electronic device 200*b* may establish the third communication connection with the electronic device 101 based on a first communication scheme, and establish the second communication connection with the first external electronic device 200*a* based on a second communication scheme different from the first communication scheme.

Figure 5:
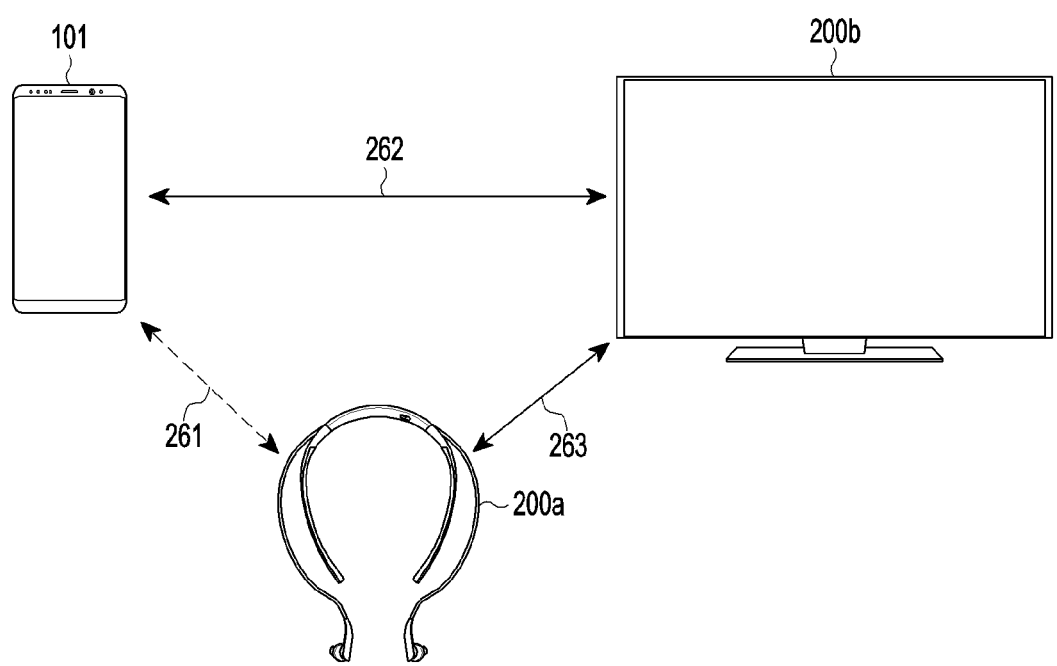
FIG. 5 illustrates a diagram of an electronic device and an external electronic device according to various embodiments.

FIG. 5 illustrates a diagram of an electronic device and an external electronic device according to various embodiments.

As illustrated in FIG. 5, an electronic device 101 may establish a third communication connection 262 with a second external electronic device 200*b* without passing through a server 108. The electronic device 101 may receive information about the second external electronic device 200*b* through the third communication connection 262, and may request a communication connection between the first external electronic device 200*a* and the second external electronic device 200*b* through the third communication connection 262. The electronic device 101 may request the second external electronic device 200*b* to release a first communication connection 261 with the first external electronic device 200*a* and establish a second communication connection 263. So, the second external electronic device 200*b* may establish the second communication connection 263 with the first external electronic device 200*a*.

Figure 10:
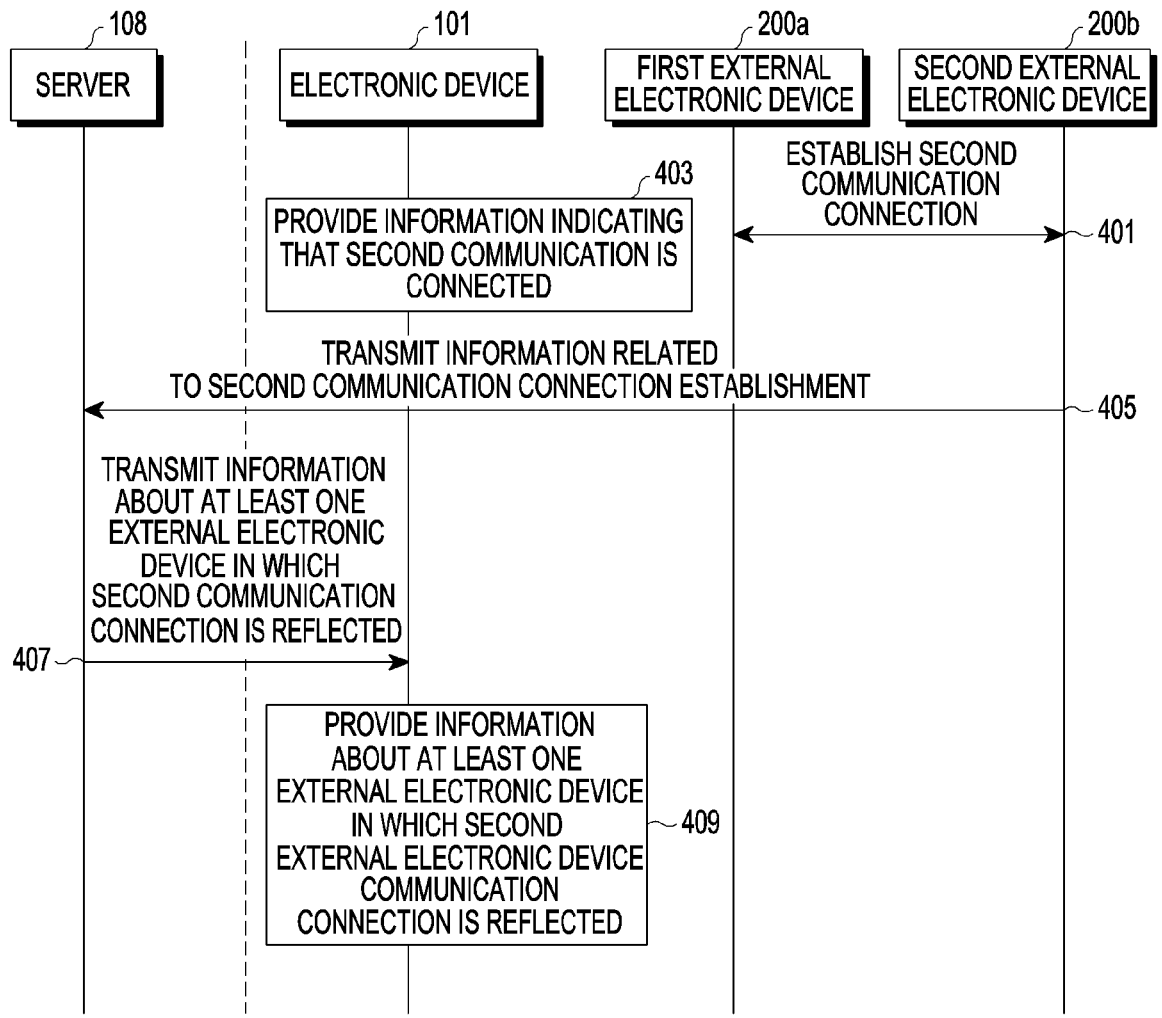
FIG. 10 illustrates a flowchart for describing an operating method of an electronic device according to various embodiments.
Figure 11:
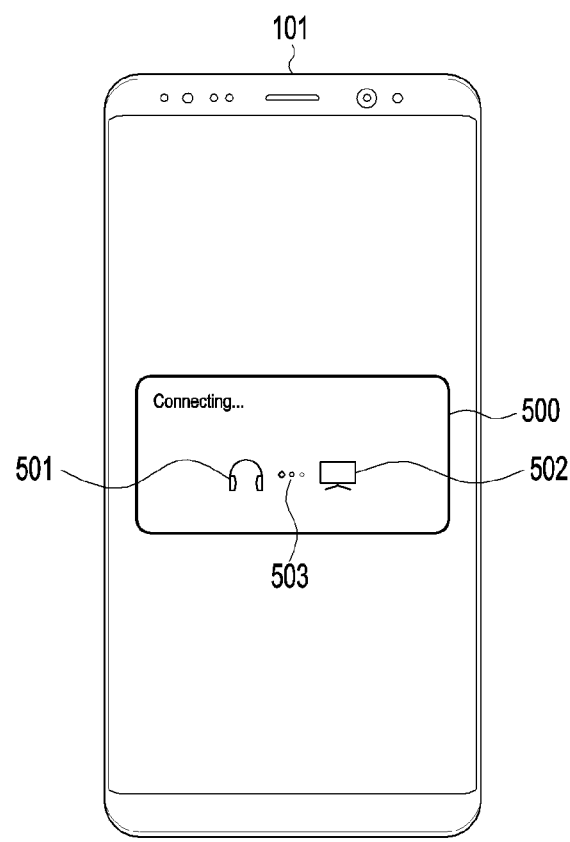
FIG. 11 illustrates an example of a screen displayed by an electronic device according to various embodiments.
Figure 12:
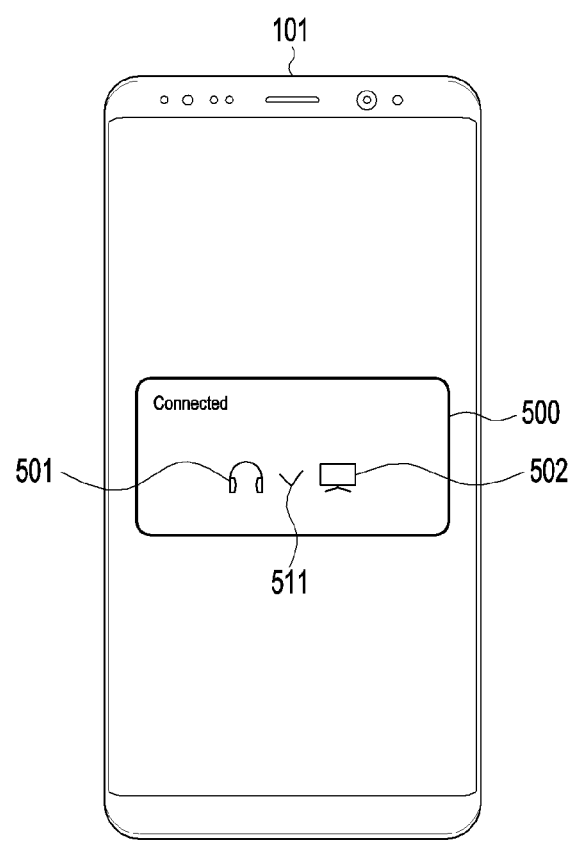
FIG. 12 illustrates another example of a screen displayed by an electronic device according to various embodiments.
Figure 13:
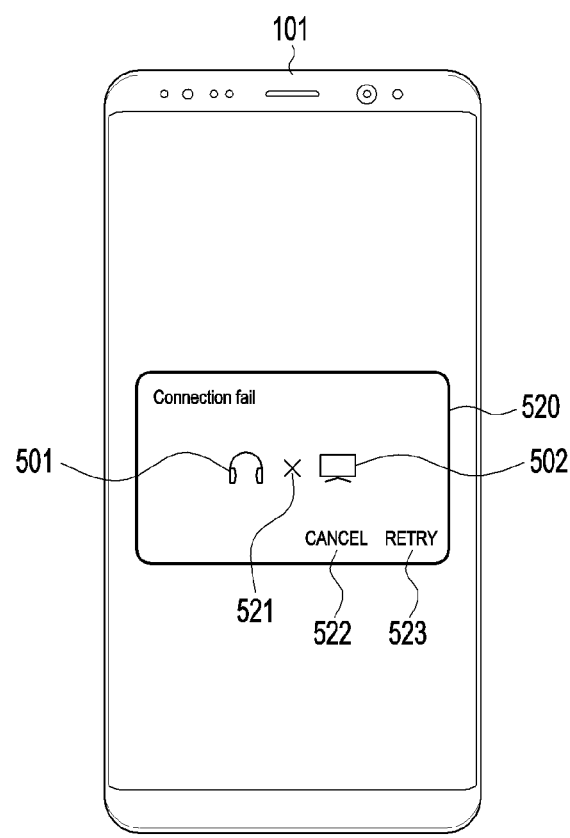
FIG. 13 illustrates still another example of a screen displayed by an electronic device according to various embodiments.

FIG. 10 illustrates a flowchart for describing an operating method of an electronic device according to various embodiments. An embodiment of FIG. 10 will be described in more detail with reference to FIGS. 11 to 13. FIG. 11 illustrates an example of a screen displayed by an electronic device according to various embodiments. FIG. 12 illustrates another example of a screen displayed by an electronic device according to various embodiments. FIG. 13 illustrates still another example of a screen displayed by an electronic device according to various embodiments.

In operation 401, a first external electronic device 200*a* according to various embodiments may establish a second communication connection with a second external electronic device 200*b*. Operation 401 may be, for example, operation 217 of FIG. 2, and at least some of operations of FIG. 10 may be subsequent operations of operation 217 of FIG. 2.

In operation 403, the electronic device 101 (e.g., a processor 120) according to various embodiments may provide information indicating that a second communication is connected. For example, as illustrated in FIG. 11, the electronic device 101 may display a user interface 500 including an object 501 which is shaped as a first external electronic device, an object 502 which is shaped as a second external electronic device, and an object 503 indicating that they are connected. For example, the electronic device 101 may display the user interface 500 indicating that external electronic devices are connected after releasing a communication connection with the first external electronic device 200*a*.

When the communication connection with the first external electronic device 200*a* is completed, the second external electronic device 200*b* may transmit, to the server 108, information related to establishment of a second communication connection in operation 405. In operation 407, the server 108 may transmit, to the electronic device 101, information about at least one external electronic device in which the second communication connection is reflected. In FIG. 10, although it is shown that the server 108 transmits, to only the electronic device 101, the information about the at least one external electronic device in which the second communication connection is reflected, the server 108 may transmit, to at least part of electronic devices which are registered in a user account Information, the information about the at least one external electronic device in which the second communication connection is reflected. In operation 409, the electronic device 101 may provide the information about the at least one external electronic device in which the second communication connection is reflected. For example, as illustrated in FIG. 12, the electronic device 101 may display the user interface 500 including the object 501 which is shaped as the first external electronic device, the object 502 which is shaped as the second external electronic device, and an object 511 indicating that a connection is established. If the electronic device 101 does not identify that a connection between the first external electronic device 200*a* and the second external electronic device 200*b* is established, the electronic device 101 may display, as illustrated in FIG. 13, the user interface 500 including the object 501 which is shaped as the first external electronic device, the object 502 which is shaped as the second external electronic device, an object 521 indicating that a connection fails, a connection cancel command icon 522, and a connection retry command icon 523.

In various embodiments, the second external electronic device 200*b* may directly transmit, to the electronic device 101, information related to the establishment of the second communication connection without passing through the server 108. For example, the second external electronic device 200*b* may establish a communication connection with the electronic device 101 simultaneously while establishing the second communication connection with the first external electronic device 200*a*. That is, the second external electronic device 200*b* may establish multi-paring, in this case, the second external electronic device 200*b* may directly transmit, to the electronic device 101, the information related to the establishment of the second communication connection.

Figure 14:
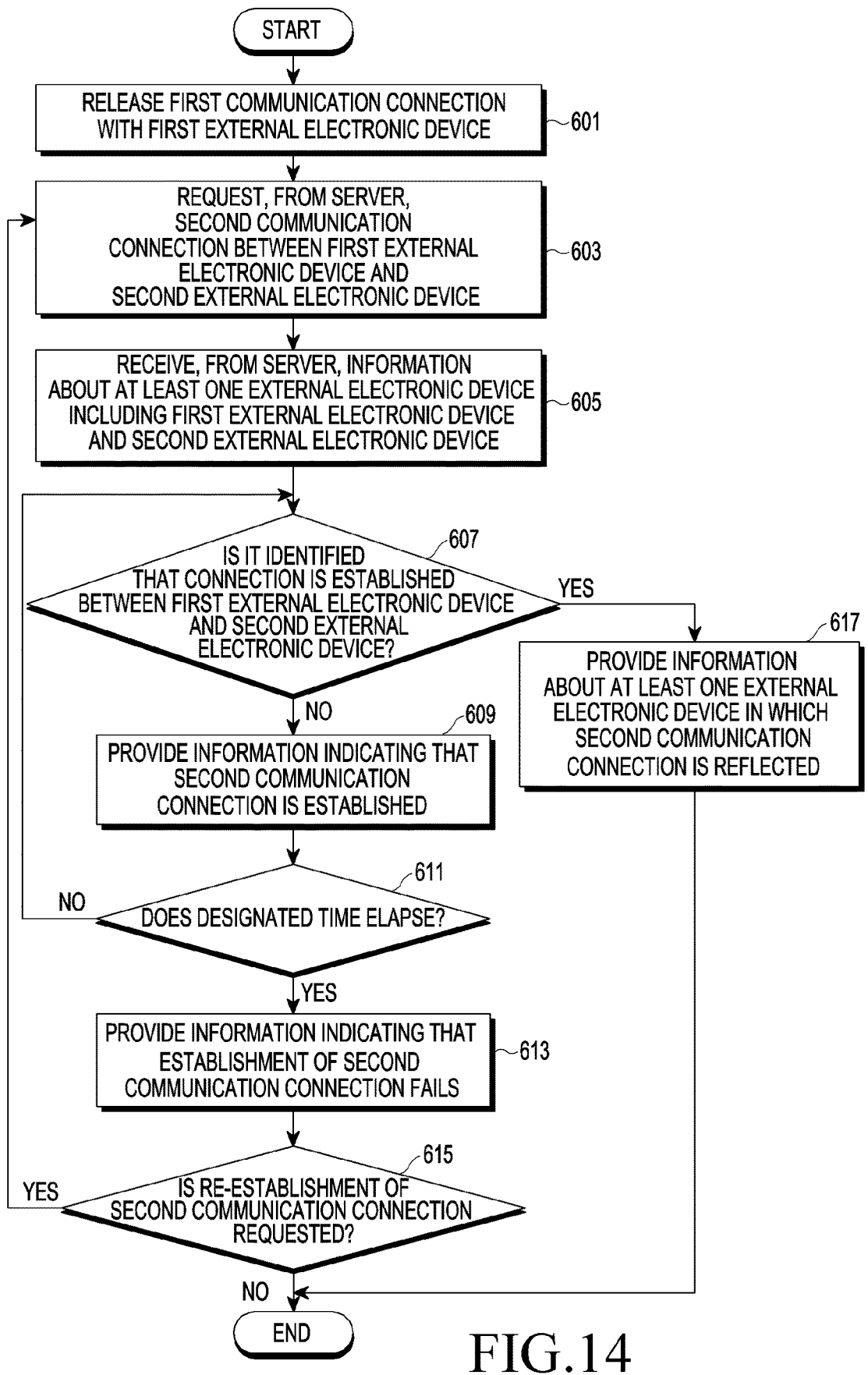
FIG. 14 illustrates a flowchart for describing an operating method of an electronic device according to various embodiments.

FIG. 14 illustrates a flowchart for describing an operating method of an electronic device according to various embodiments.

According to various embodiments, in operation 601, an electronic device 101 may release a first communication connection with a first external electronic device 200*a*. For example, the electronic device 101 may receive, from a user, a connection command between the first external electronic device 200*a* and a second external electronic device 200*b* after establishing the first communication connection with the first external electronic device 200*a*. So, the electronic device 101 may release the first communication connection with the first external electronic device 200*a*. For example, the electronic device 101 may receive, from a server 108, at least one of a command for a connection, an address of the first external electronic device 200*a*, a device type of the first external electronic device 200*a*, an icon index, a supported service, or a connection protocol.

In operation 603, the electronic device 101 may request, from the server 108, a second communication connection between the first external electronic device 200*a* and the second external electronic device 200*b*. In operation 605, the electronic device 101 may receive, from the server 108, information about at least one external electronic device including the first external electronic device 200*a* and the second external electronic device 200*b*. For example, the electronic device 101 may receive information about an external electronic device registered in a first user account. The information about the external electronic device may include information indicating whether the second external electronic device 200b is connected with the first external electronic device 200a.

In operation 607, the electronic device 101 may identify whether a connection is established between the first external electronic device 200a and the second external electronic device 200b. If it is identified that the connection is not established between the first external electronic device 200a and the second external electronic device 200b, in operation 609, the electronic device 101 may provide information indicating that a second communication connection is established. For example, the electronic device 101 may display a user interface as illustrated in FIG. 11. In operation 611, the electronic device 101 may identify whether designated time elapses. If the designated time does not elapse, the electronic device 101 may identify again whether the connection is established between the first external electronic device 200a and the second external electronic device 200b. If it is identified that the designated time elapses, the electronic device 101 may provide information indicating that establishment of the second communication connection fails in operation 613. For example, the electronic device 101 may display a user interface as illustrated in FIG. 13. In operation 615, the electronic device 101 may identify whether re-establishment of the second communication connection is requested. If the re-establishment of the second communication connection is requested, the electronic device 101 may re-request, from a server 108, a connection between the first external electronic device 200a and the second external electronic device 200b. If it is identified that the connection is established between the first external electronic device 200a and the second external electronic device 200b, the electronic device 101, in operation 617, may provide information about at least one external electronic device in which the second communication connection is reflected. For example, the electronic device 101 may display a user interface as illustrated in FIG. 12. Alternatively, the electronic device 101 may display the fact that the first external electronic device 200a is connected to the second external electronic device 200b. If there is no reconnection request (615-No), the electronic device 101 may end the operation. Alternatively, the electronic device 101 may establish the first communication connection with the first external electronic device 200a again.

Figure 15:
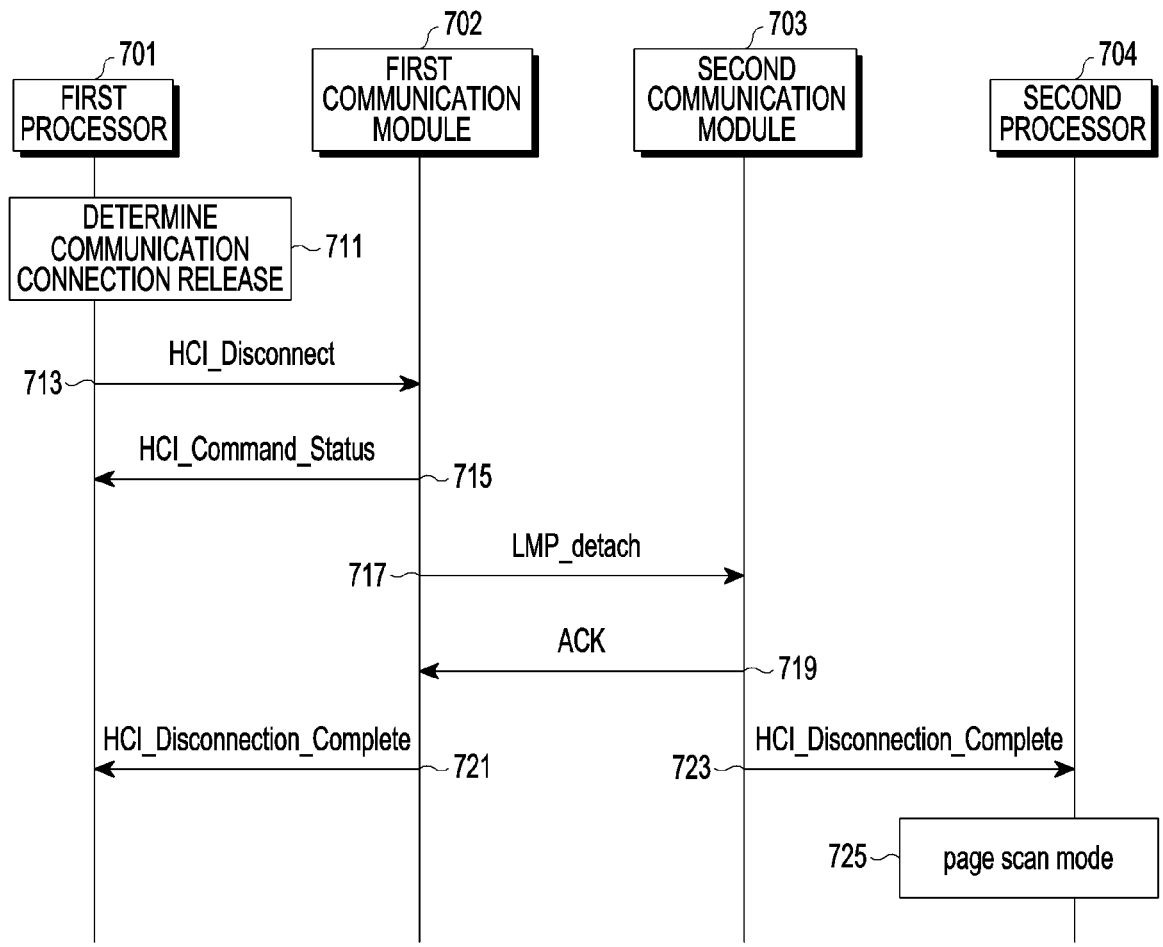
FIG. 15 illustrates an example of a flowchart for describing an operating method of an electronic device and a first external electronic device according to various embodiments.

FIG. 15 illustrates an example of a flowchart for describing an operating method of an electronic device and a first external electronic device according to various embodiments.

Figure 16:
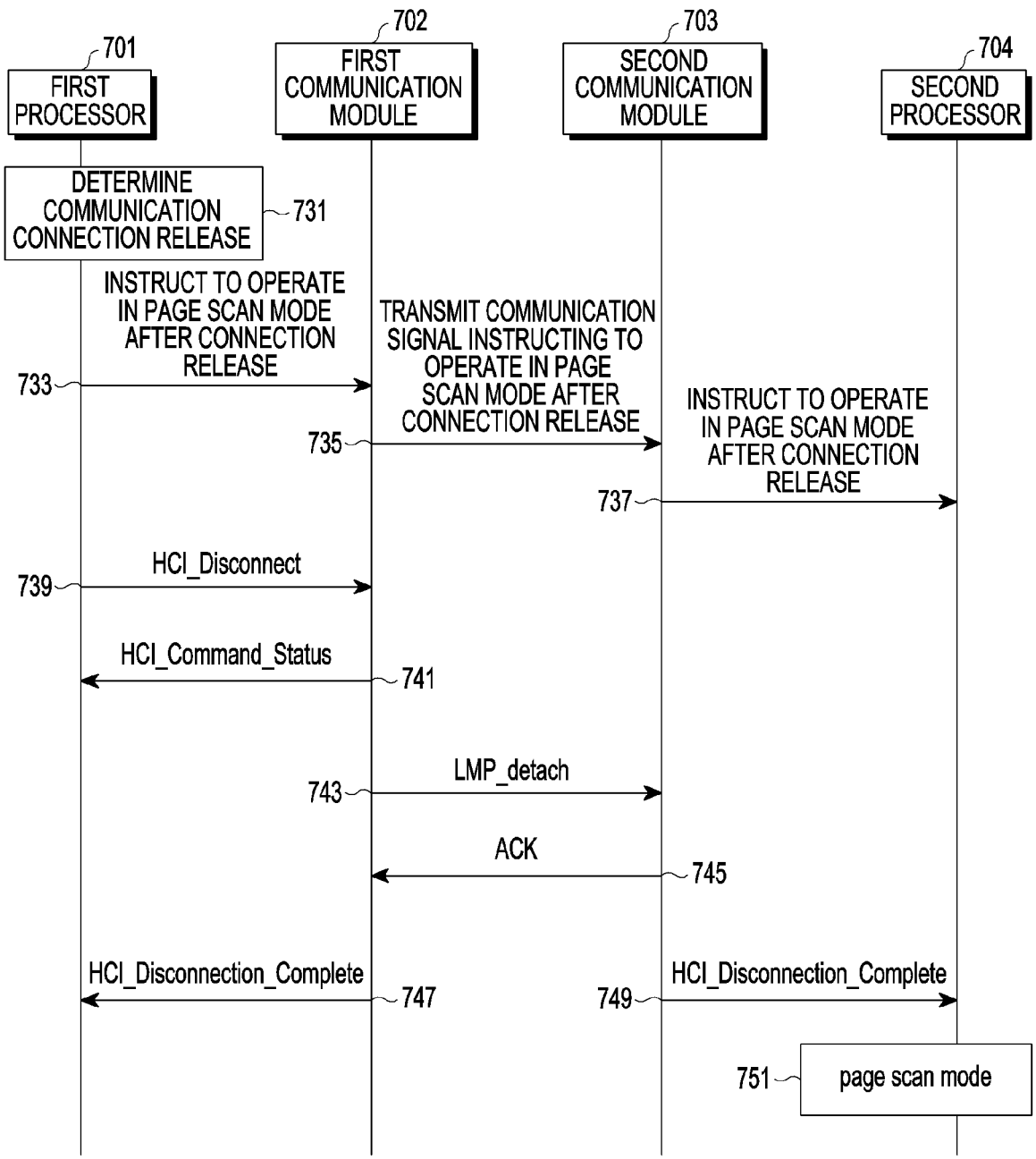
FIG. 16 illustrates another example of a flowchart for describing an operating method of an electronic device and a first external electronic device according to various embodiments.

FIG. 16 illustrates another example of a flowchart for describing an operating method of an electronic device and a first external electronic device according to various embodiments.

According to an embodiment, an electronic device 101 may include a first processor 701 (e.g., a processor 120) and a first communication module 702 (e.g., a communication module 190), and a first external electronic device 200a may include a second processor 704 and a second communication module 703. The first processor 701 and the second processor 704 may correspond to a host defined in a Bluetooth standard, and the first communication module 702 and the second communication module 703 may correspond to a controller defined in the Bluetooth standard. The electronic device 101 may be a master, and the first external electronic device 200a may be a slave.

Referring to FIG. 15, according to various embodiments, in operation 711, the electronic device 101 may determine communication connection release. For example, the electronic device 101 may determine the communication connection release based on a user's input.

In operation 713, the first processor 701 may transmit host controller interface_disconnect (HCI_Disconnect) to the first communication module 702. In operation 715, the first communication module 702 may transmit HCI_Command_Status to the first processor 701. The first communication module 702 may transmit link manager protocol_detach (LMP_detach) to the second communication module 703 in operation 717. In operation 719, the second communication module 703 may transmit ACK to the first communication module 702. In operation 721, the first communication module 702 may transmit HCI_Disconnection_Complete to the first processor 701. In addition, the second communication module 703 may transmit HCI_Disconnection_Complete to the second processor 704 in operation 723. In various embodiments, the HCI_Disconnection_Complete may include a reason of a remote user terminated connection (0x13). The second processor 704 may enter a page scan mode based on a connection release state in operation 725. Thereafter, the first external electronic device 200a may scan a second external electronic device 200b, and may establish a communication connection with the second external electronic device 200b.

Referring to FIG. 16, the first processor 701 may determine a communication connection release in operation 731. In operation 733, the first processor 701 may instruct the first external electronic device 200a to operate in a page scan mode after communication connection is released through the first communication module 702. In operation 735, the first communication module 702 may transmit, to the second communication module 703, a communication signal instructing to operate in the page scan mode after the connection release. In operation 737, the second processor 704 may identify, through the second communication module 703, that the second processor 704 will operate in the page scan mode after the connection release. Operations 739 to 749 are substantially the same as operations 711 to 723 in FIG. 15, and a detailed description thereof will be omitted herein. In operation 751, the second processor 704 may operate in the page scan mode after the connection release according to the identification in operation 737. Thereafter, the first external electronic device 200a may scan the second external electronic device 200b, and may establish a communication connection with the second external electronic device 200b.

Figure 17:
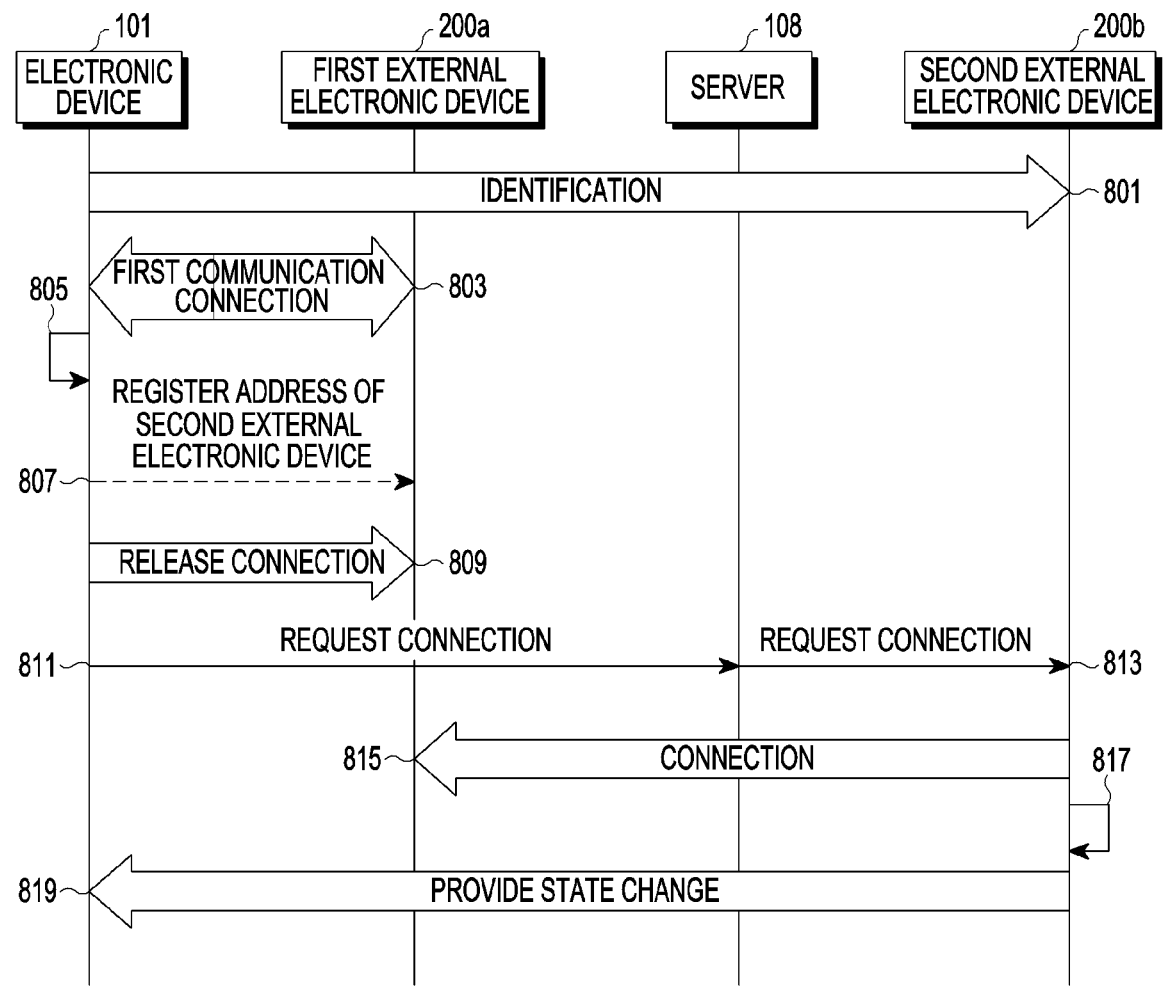
FIG. 17 illustrates a flowchart for describing an operating method of an electronic device according to various embodiments.
Figure 18:
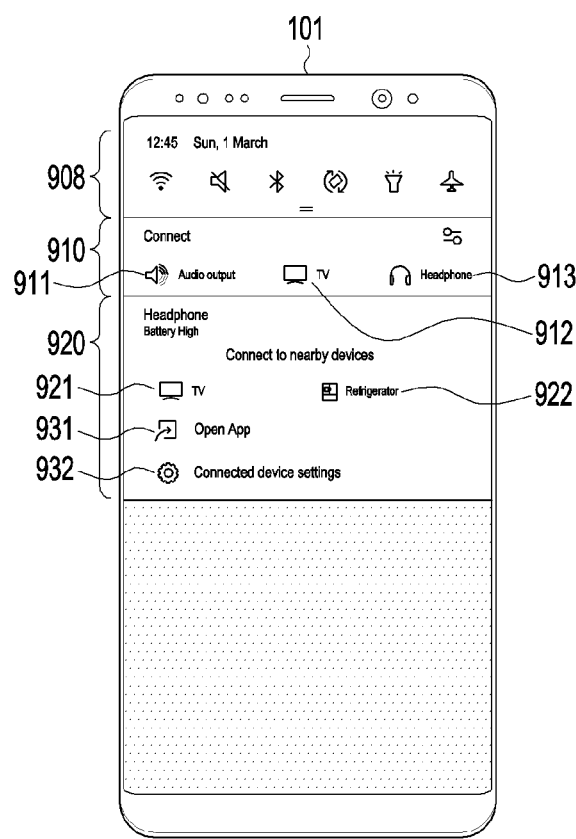
FIG. 18 illustrates an example of a screen displayed by an electronic device according to various embodiments.
Figure 19:
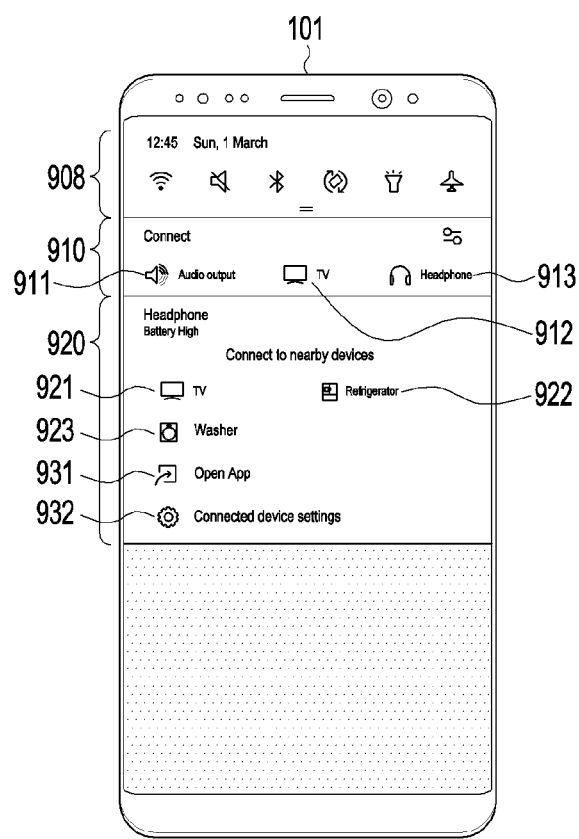
FIG. 19 illustrates another example of a screen displayed by an electronic device according to various embodiments.
Figure 20:
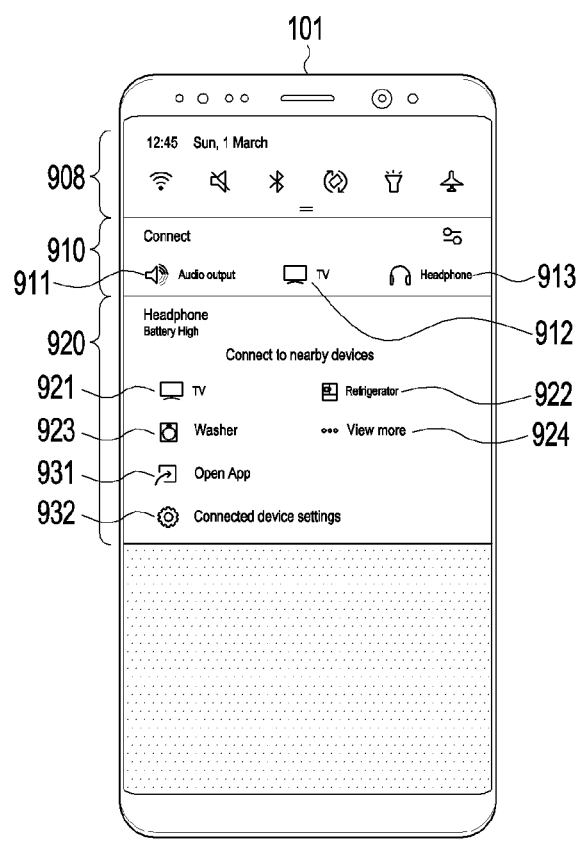
FIG. 20 illustrates still another example of a screen displayed by an electronic device according to various embodiments.
Figure 21:
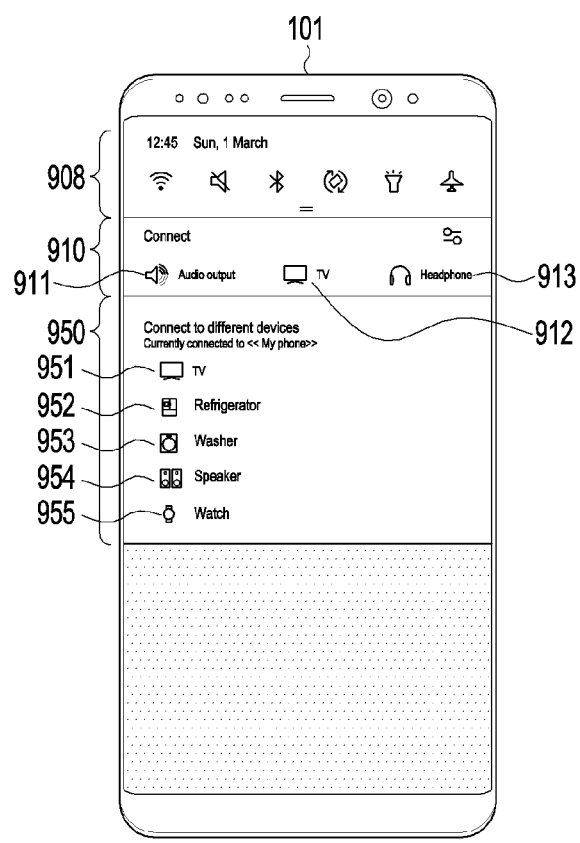
FIG. 21 illustrates still another example of a screen displayed by an electronic device according to various embodiments.

FIG. 17 illustrates a flowchart for describing an operating method of an electronic device according to various embodiments. An embodiment of FIG. 17 will be described in more detail with reference to FIGS. 18 to 21. FIG. 18 illustrates an example of a screen displayed by an electronic device according to various embodiments. FIG. 19 illustrates another example of a screen displayed by an electronic device according to various embodiments. FIG. 20 illustrates still another example of a screen displayed by an electronic device according to various embodiments. FIG. 21 illustrates still another example of a screen displayed by an electronic device according to various embodiments.

According to various embodiments, in operation 801, an electronic device 101 (e.g., a processor 120) may identify a second external electronic device 200b. For example, the electronic device 101 may receive an advertising signal from the second external electronic device 200b through a communication module 190, so the electronic device 101 may identify that the second external electronic device 200b is within a communication range. Meanwhile, in the drawing, although the identification operation of 801 is illustrated as being preceded by operations 803 and 805, this is merely exemplary, and the identification operation of 801 may be performed later than a communication connection operation of 803 or a connection command reception operation of 805, which will be described in more detail later, or may be performed substantially simultaneously with operations 803 and 805. In operation 803, the electronic device 101 may establish a first communication connection with the first external electronic device 200a. The electronic device 101 may display an external electronic device (e.g., the second external electronic device 200b) which is identified to be located within a communication range or a designated range. For example, as shown in FIG. 18, the electronic device 101 may display an icon 908 indicating at least one state. According to an embodiment, the electronic device 101 may display information 910 about at least one of an electronic device which is connected through an account, or an electronic device which is connected through a short-range communication based on information of at least one external electronic device received from a server 108. For example, the electronic device 101 may display an icon 912 which corresponds to an external electronic device identified to be located within a communication range or a designated range among external electronic devices which are connected through an account, and an icon 913 of an electronic device connected through a short-range communication. If it is detected that the icon 913 is selected, the electronic device 101 may provide additional information about a corresponding electronic device (e.g., the first external electronic device 200a). For example, a list 920 of electronic devices to which the first external electronic device 200a may connect may be displayed. The corresponding list 920 may include icons 921 and 922 indicating at least one external electronic device to which the first external electronic device 200a may connect, an application execution icon 931, and an icon 932 for activating setting of a connected device. If a connectable external electronic device is added, as shown in FIG. 19, an icon (for example, an icon 923) may be additionally displayed between the icons 921 and 922 and the icons 931 and 932. In addition, if the number of connectable icons is greater than or equal to a designated value, the electronic device 101 may display an icon 924 capable of calling another icon, as shown in FIG. 20. When it is detected that the corresponding icon 924 is selected, the electronic device 101 may stop displaying the icons 931 and 932 and display icons 951, 952, 953, 954, 955 related to a plurality of external electronic device which are connectable as shown in FIG. 21. For example, the electronic device 101 may select and display icons for some of connectable electronic devices in consideration of connection frequency and performance. Alternatively, the electronic device 101 may determine an arrangement order of icons in consideration of, for example, the connection frequency and the performance. In various embodiments, when an icon 911 indicating that audio is output is designated, the electronic device 101 may provide a user interface capable of changing an external electronic device which performs an audio output. That is, the electronic device 101 may release or establish a connection with an external electronic device based on various implementation schemes. The electronic device 101 may separately display information received through the server 108 from, for example, information received from the first external electronic device 200b through a short-range communication. For example, the electronic device 101 may determine a sorting order among corresponding information or display the corresponding information by applying visually different effects (e.g., a color, an icon size, or additional icon display, etc.) based on an entity which transmits the corresponding information.

Referring back to FIG. 17, in operation 805, the electronic device 101 may receive a connection command between the second external electronic device 200b and the first external electronic device 200a. For example, the electronic device 101 may receive the connection command between the second external electronic device 200b and the first external electronic device 200a by acquiring a selection of an icon (e.g., an icon 921) which corresponds to the second external electronic device 200b through a user interface of any one of FIGS. 18 to 21. More specifically, the electronic device 101 may receive the connection command between the second external electronic device 200b and the first external electronic device 200a by acquiring, from a user, the selection of the icon (e.g., the icon 921) which corresponds to the second external electronic device 200b among icons which are displayed within items connectable to the first external electronic device 200a. In operation 807, the electronic device 101 may register an address of the second external electronic device 200b in the first external electronic device 200a. In another embodiment, the electronic device 101 may not register the address (e.g., a Bluetooth MAC address, class of device (COD) information, device name information) of the second external electronic device 200b in the first external electronic device. In operation 809, the electronic device 101 may release a connection with the first external electronic device 200a. The first external electronic device 200a may enter a page scan mode after the first communication connection is released. In operation 811, the electronic device 101 may transmit, to the server 108, the connection request between the first external electronic device 200a and the second external electronic device 200b. In operation 813, the server 108 may transmit, to the second external electronic device 200b, the connection request between the first external electronic device 200a and the second external electronic device 200b. Meanwhile, as described with reference to FIG. 4, the electronic device 101 may transmit directly, to the second external electronic device 200b, the connection request between the first external electronic device 200a and the second external electronic device 200b without passing through the server 108.

In operation 815, the second external electronic device 200b may establish a connection with the first external electronic device 200a based on the received connection request with the first external electronic device 200a. In operation 817, when the connection is established, the second external electronic device 200b may update a state of the second external electronic device 200b to the server 108. In operation 819, the second external electronic device 200b may provide the electronic device 101 with state change information. For example, the second external electronic device 200b may transmit, to the electronic device 101 through the server 108, information about the first external electronic device 200a and a connection state. For another example, the second external electronic device 200b may transmit the information about the first external electronic device 200a and the connection state to the electronic device 101 through a short-range communication. If the connection fails, the second external electronic device 200b may update a failure reason to the server 108 as the state information. The electronic device 101 may receive information related to the failure from the server 108, so the electronic device 101 may also perform a reconnection.

Figure 22:
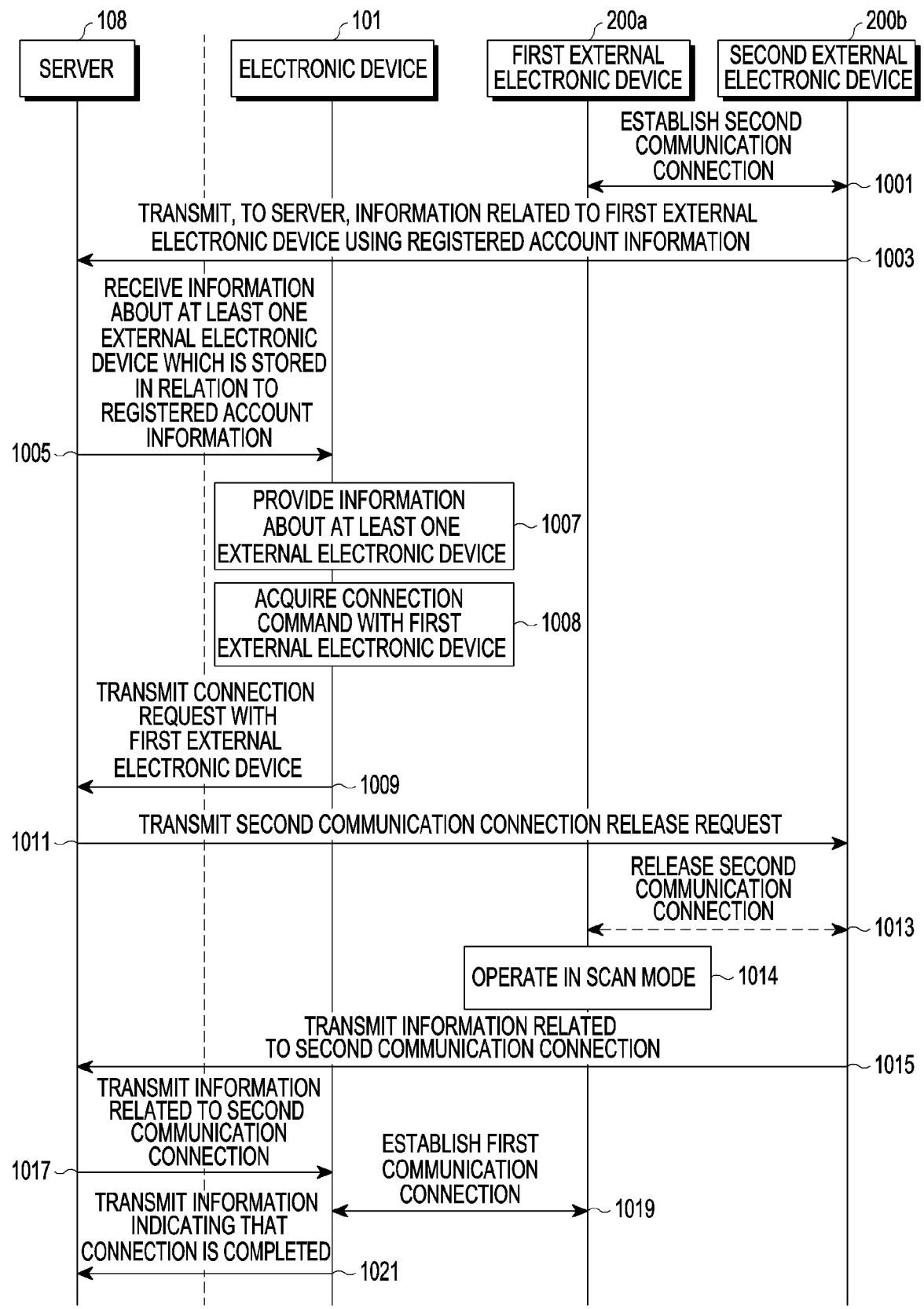
FIG. 22 illustrates a flowchart for describing an operating method of an electronic device according to various embodiments.
Figure 27:
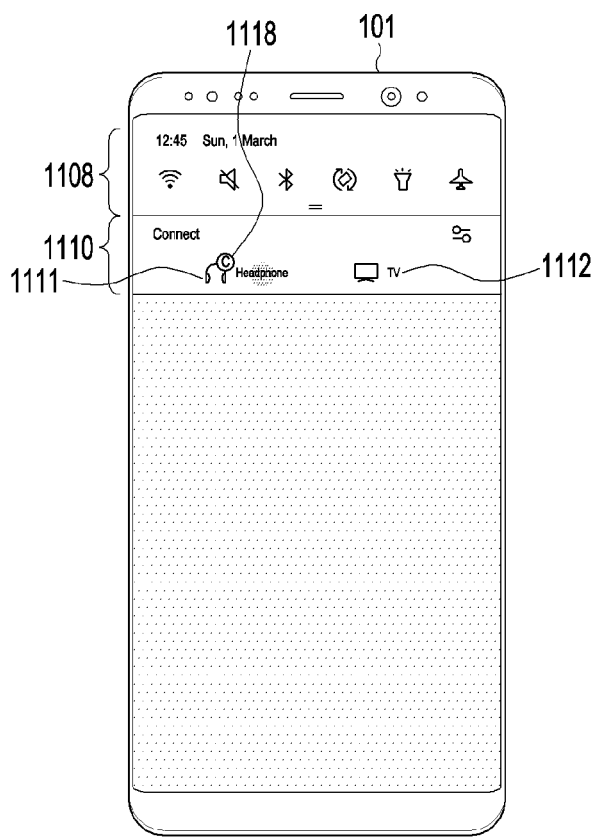
FIG. 27 illustrates an example of a screen displayed by an electronic device according to various embodiments.
Figure 28:
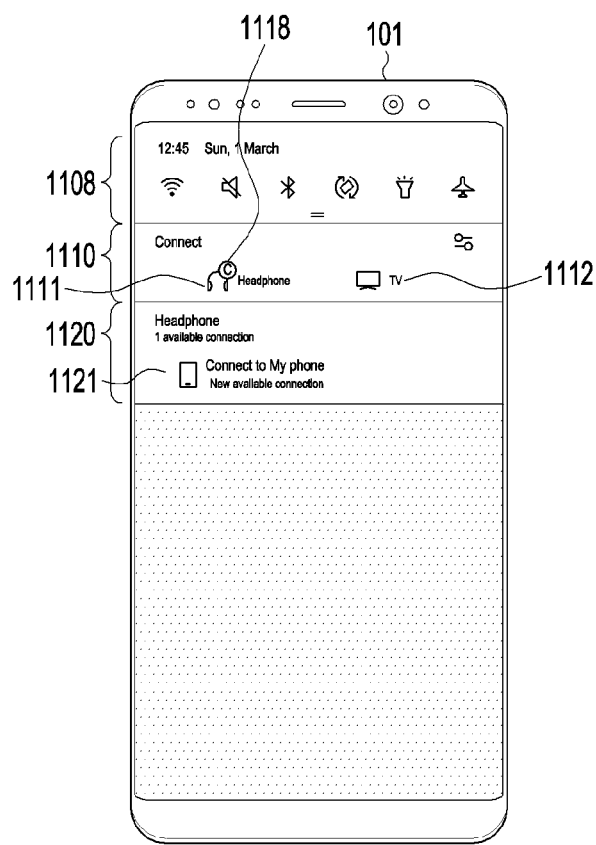
FIG. 28 illustrates another example of a screen displayed by an electronic device according to various embodiments.
Figure 29:
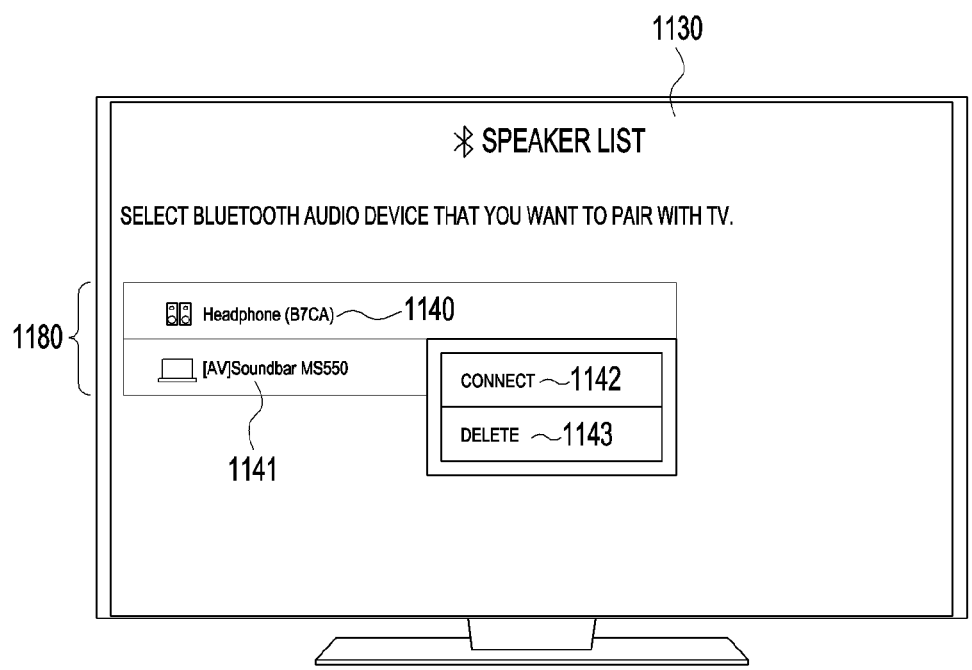
FIG. 29 illustrates still another example of a screen displayed by an electronic device according to various embodiments.

FIG. 22 illustrates a flowchart for describing an operating method of an electronic device according to various embodiments. An embodiment of FIG. 22 will be described in more detail with reference to FIGS. 27 to 29. FIG. 27 illustrates an example of a screen displayed by an electronic device according to various embodiments. FIG. 28 illustrates another example of a screen displayed by an electronic device according to various embodiments. FIG. 29 illustrates still another example of a screen displayed by an electronic device according to various embodiments.

According to various embodiments, in operation 1001, a first external electronic device 200a may establish a second communication connection with a second external electronic device 200b. The second communication connection may be established earlier than a first communication connection, which will be described later, however, for consistency with a name of the previous embodiment, a communication connection established between the first external electronic device 200a and the second external electronic device 200b may be referred to as a second communication connection. In operation 1003, the second external electronic device 200b may transmit, to a server 108, information related to the first external electronic device 200a using a registered account information. For example, the second external electronic device 200b may be an electronic device in which an Internet communication is possible.

According to various embodiments, in operation 1005, an electronic device 101 may receive, from the server 108, information about at least one external electronic device which is stored in relation to registered account information. For example, the electronic device 101 may receive, from the server 108, information indicating that the first external electronic device 200a is connected to the second external electronic device 200b and information about the first external electronic device 200a. In operation 1007, the electronic device 101 may provide information about at least one external electronic device. For example, the electronic device 101 may display an icon 1108 indicating at least one state, as shown in FIG. 27. According to an embodiment, the electronic device 101, based on the information about at least one electronic device received from the server 108, may display information 1110 about at least one of an electronic device which is connected through an account and an electronic device which is connected to the electronic device 101 through a short-range communication. The electronic device 101 may receive at least one of device information or state information of an external electronic device. The electronic device 101 may receive, for example, at least one of a name, a MAC address, information indicating a type, some or all of advertising information, or an update time of the external electronic device. In addition, the electronic device 101 may receive at least one of device information or state information about an electronic device which is connected to the external electronic device through a short-range communication. When various conditions such as a case of logging in through an application, a case of updating information to a server, a case of running the application, or a case of connecting to a new device are detected, the electronic device 101 may receive, from the server 108, at least one of device information or state information of an external electronic device, and there is no limitation on a reception condition. The electronic device 101 may display an icon 1112 which corresponds to the second external electronic device 200b and an icon 1111 which corresponds to the first external electronic device 200a connected to the second external electronic device 200a. The electronic device 101 may also display an object 1118 with intention that the first external electronic device 200a is connected to another external electronic device (e.g., the second external electronic device 200b).

In operation 1008, the electronic device 101 may acquire a connection command with the first electronic device 101. For example, when it is detected that an icon 1111 which corresponds to the first external electronic device 200a connected to the second external electronic device 200a in FIG. 27 is selected, the electronic device 101 may display a list 1120 to which the first external electronic device 200a is connectable as shown in FIG. 28. The list 1120 may include, for example, an icon 1121 which corresponds to the electronic device 101. When it is detected that the icon 1121 which corresponds to the electronic device 101 is selected, the electronic device 101 may start to establish a communication connection between the electronic device 101 and the first external electronic device 200a.

According to an embodiment, if the electronic device 101 is implemented as a TV, a connection target list 1180 may be displayed on a screen 1130 as shown in FIG. 29. In the connection target list 1180, icons 1140 and 1141 indicating targets which may be connected may be displayed. According to an embodiment, if one (for example, the icon 1141) of the icons 1140 and 1141 included in the connection target list 1180 is selected, an icon 1142 for commanding a connection or an icon 1143 for commanding deletion may be displayed. In this case, the electronic device 101 may release or establish a connection with an external electronic device based on a signal from a control device such as a remote controller.

In operation 1009, the electronic device 101 may transmit, to the server 108, a connection request with the first external electronic device 200a. Information which the electronic device 101 transmits to the server 108 (for example, the connection request with the first external electronic device 200a), or information that the second external electronic device 200b transmits to the server 108 (e.g., at least one of the device information or the state information of the second external electronic device 200b, or information related to a communication connection between the second external electronic device 200b and the first external electronic device 200a) may be transmitted to nearby electronic devices through the short-range communication. For example, the electronic device 101 may transmit at least one of a command related to a connection, an address of the first external electronic device 200a (e.g., a MAC address, class of device (COD) information, device name information), a device type of the first external electronic device 200a, an icon index, a supported service, or a connection protocol. In operation 1011, the server 108 may transmit a second communication connection release request to the second external electronic device 200b. In various embodiments, the server 108 may identify that the first external electronic device 200a and the second external electronic device 200b are connected to each other based on at least one of information received from the second external electronic device 200b or information received from the first external electronic device 200a, and then, transmit, to the second external electronic device 200b, a second communication connection release request. In operation 1013, the second external electronic device 200b may release the second communication connection with the first external electronic device 200a. In operation 1014, the first external electronic device 200a may operate in a page scan mode. In operation 1015, the second external electronic device 200b may transmit, to the server 108, information related to the second communication connection, for example, information indicating that the second communication connection is released. In operation 1017, the server 108 may transmit, to the electronic device 101, the received information related to the second communication connection (e.g., connection release information). The electronic device 101 may receive, from the server 108, at least one of a command related to a connection, an address (e.g., a MAC address, class of device (COD) information, device name information) of the first external electronic device 200*a*, a device type of the first external electronic device 200*a*, an icon index, a supported service, or a connection protocol. The electronic device 101 may identify the second communication connection release based on the received information, and establish a first communication connection with the first external electronic device 200*a* in operation 1019. The electronic device 101 may transmit an ID packet using address information of the first external electronic device 200*a*, and receive a response to this from the first external electronic device 200*a*. When the first communication connection is established, the electronic device 101 may display that the connection is completed.

In operation 1021, the electronic device 101 may transmit, to the server 108, information indicating that the connection is completed. For example, the electronic device 101 may transmit, to the server 108, at least one of a device name, address (e.g., a MAC address, class of device (COD) information, device name information), information indicating a device type, some or all of data of advertising information, or update time of the first external electronic device 200*a*. According to this, another device which accesses a user account may identify that a communication connection is established between the electronic device 101 and the first external electronic device 200*a*.

Figure 23:
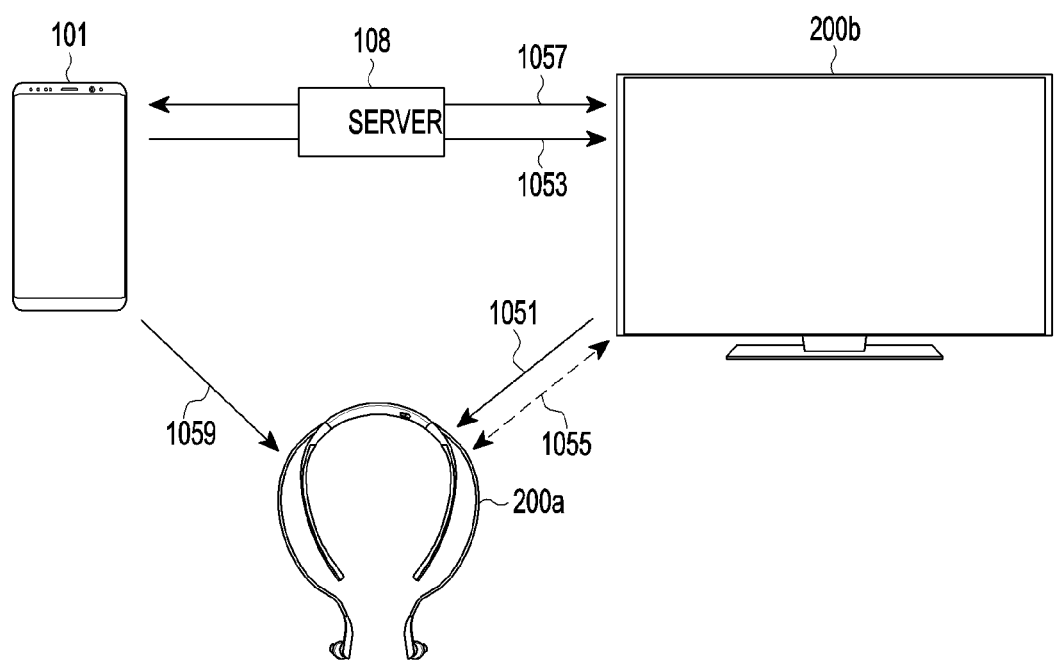
FIG. 23 illustrates a diagram for describing an operation of an electronic device according to various embodiments.

FIG. 23 illustrates a diagram for describing an operation of an electronic device according to various embodiments.

Referring to FIG. 23, an electronic device 101 may be implemented as, for example, a communication terminal such as a smart phone, a first external electronic device 200*a* may be implemented as, for example, a headphone supporting a short-range communication, and a second external electronic device 200*b* may be implemented as, for example, a TV. The first external electronic device 200*a* and the second external electronic device 200*b* may establish a second communication connection 1055, and then transmit and receive data. The electronic device 101 may transmit, to a server 108, a release command 1053 for the second communication connection to a server 108, and the server 108 may transmit, to the second external electronic device 200*b*, a release command 1054 for the second communication connection. At least part of information included in the release command 1053 may be the same as at least part of information included in the release command 1054. The second external electronic device 200*b* may release (1051) the second communication connection 1055 and transmit information 1057 about the second communication connection 1055 to the electronic device 101 through the server 108. For example, the second external electronic device 200*b* may transmit a signal for communication connection release (e.g., LMP_detach) to the first external electronic device 200*a*. Then, the electronic device 101 may establish a first communication connection 1059 with the first external electronic device 200*a*. Accordingly, a user may listen to multimedia data from a second external electronic device (e.g., a TV) using a first external electronic device (e.g., a headphone), and then listen to multimedia data from an electronic device (e.g., a smart phone) using the first external electronic device (e.g., the headphone).

Figure 24:
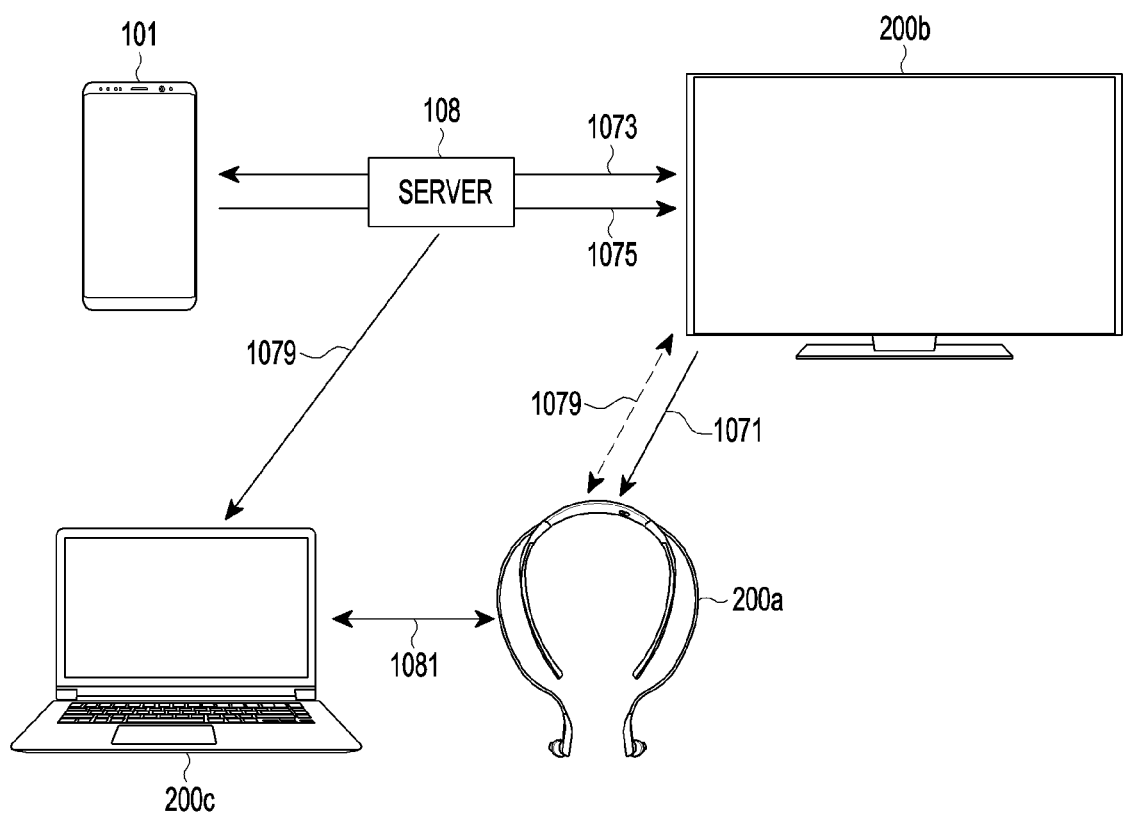
FIG. 24 illustrates a diagram for describing an operation of an electronic device according to various embodiments.

FIG. 24 illustrates a diagram for describing an operation of an electronic device according to various embodiments. In an embodiment of FIG. 24, an electronic device 101 may control a first external electronic device 200*a* to establish a communication connection with a third external electronic device 200*c*, not the electronic device 101. For example, a user may manipulate the electronic device 101 to control the first external electronic device 200*a* to be connected to the third external electronic device 200*c*, not a second external electronic device 200*b*. The second external electronic device 200*b* may establish a communication connection 1071 with the first external electronic device 200*a*. The electronic device 101 may receive information 1073 about the first external electronic device 200*a* from the second external electronic device 200*b* through the server 108. Alternatively, the electronic device 101 may receive information indicating that the second external electronic device 200*b* is connected to the first external electronic device 200*a*. The electronic device 101 may receive, from a user, a command to connect the first external electronic device 200*a* and the third external electronic device 200*c*. The electronic device 101 may transmit, to a server 108, a communication signal 1070 including a command to connect the first external electronic device 200*a* and the third external electronic device 200*c*. The server 108 may transmit a communication connection release command 1075 to the second external electronic device 200*b* based on the received communication signal 1070, so the second external electronic device 200*b* may release (1077) a communication connection 1071 with the first external electronic device 200*a*. In various embodiments, the electronic device 101 may first transmit a communication signal instructing communication connection release between the second external electronic device 200*b* and the first external electronic device 200*a*, and then transmit a communication signal instructing a communication connection between the first external electronic device 200*a* and the third external electronic device 200*c*. The server 108 may transmit, to the third external electronic device 200*c*, a communication connection command 1079 with the first external electronic device 200*a*. So, the third external electronic device 200*c* may establish a communication connection 1081 with the first external electronic device 200*a*.

Figure 25:
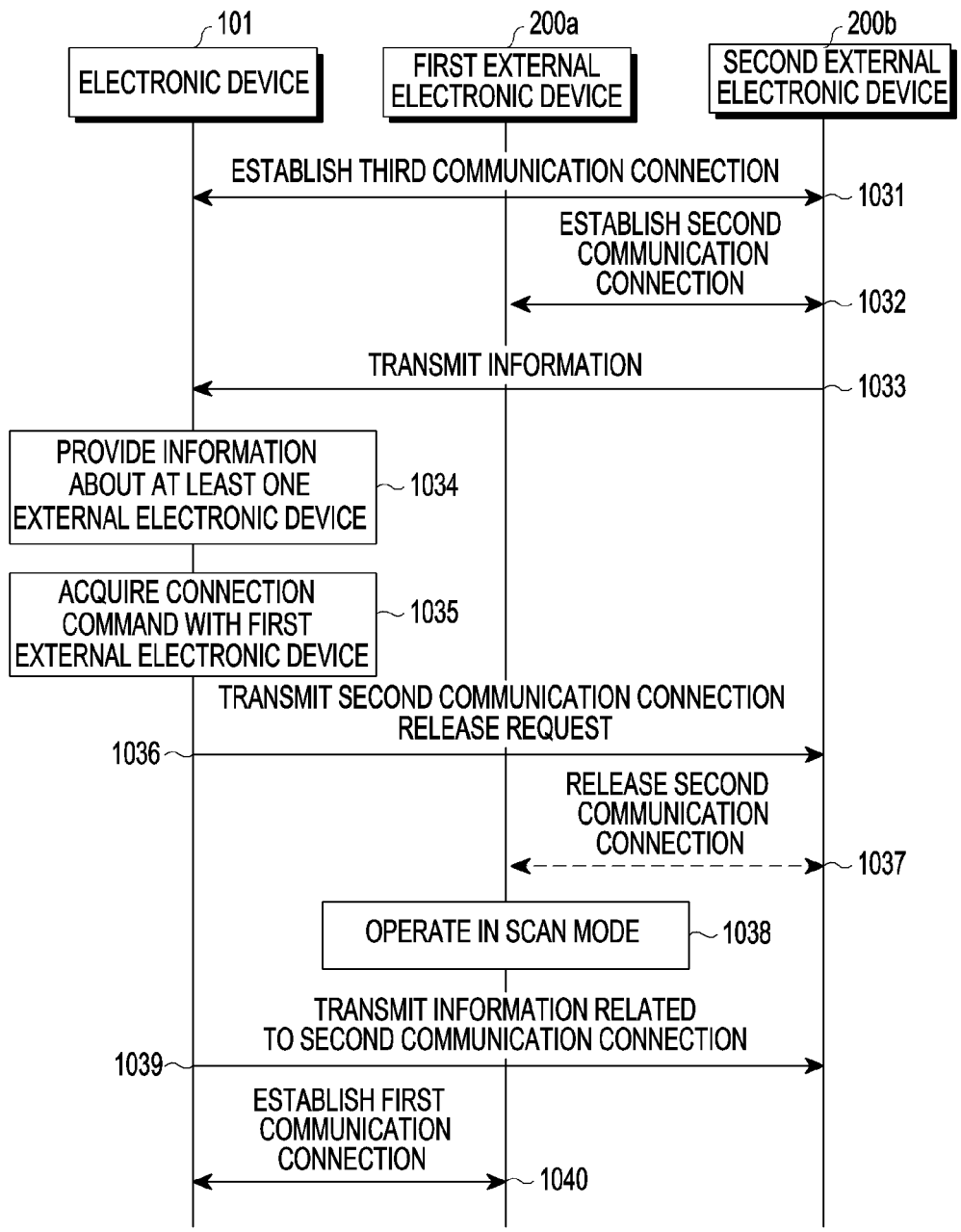
FIG. 25 illustrates a flowchart for describing an operating method of an electronic device according to various embodiments.

FIG. 25 illustrates a flowchart for describing an operating method of an electronic device according to various embodiments.

As illustrated in FIG. 25, an electronic device 101 may directly perform a communication with a second external electronic device 200*b* without passing through a server 108. An operation substantially the same as or similar to an operation of FIG. 22 among operations of FIG. 25 will be briefly described.

According to various embodiments, the electronic device 101 may establish a third communication connection with the second external electronic device 200*b* in operation 1031. For example, the electronic device 101 may establish the third communication connection with the second external electronic device 200*b* through a short-range communication. In addition, the second external electronic device 200*b* may establish a second communication connection with a first external electronic device 200*a* in operation 1032. Here, there is no limitation on a sequence relationship between operation 1031 and operation 1032. In operation 1033, the second external electronic device 200*b* may transmit, to the electronic device 101, information about at least one of the first external electronic device 200*a* or the second external electronic device 200*b* through the established third communication connection. That is, the electronic device 101 may perform a communication with the second external electronic device 200b without passing through the server 108. In operation 1034, the electronic device 101 may provide information about at least one external electronic device (e.g., at least one of the first external electronic device 200a or the second external electronic device 200b). In operation 1035, the electronic device 101 may acquire a connection command between the first external electronic device 200a and the electronic device 101. In operation 1036, the electronic device 101 may transmit, to the second external electronic device 200b, a release request for the second communication connection through the third communication connection. In operation 1037, the second external electronic device 200b may release the second communication connection. In operation 1038, the first external electronic device 200a may operate in a page scan mode. In operation 1039, the second external electronic device 200b may transmit, to the electronic device 101, information related to the second communication connection (for example, information indicating that the second communication connection is released) through the third communication connection. Then, the electronic device 101 may establish a first communication connection with the first external electronic device 200a in operation 1040. For example, the electronic device 101 may detect the first external electronic device 200a operating in the page scan mode and establish the first communication connection with the detected first external electronic device 200b.

Figure 26:
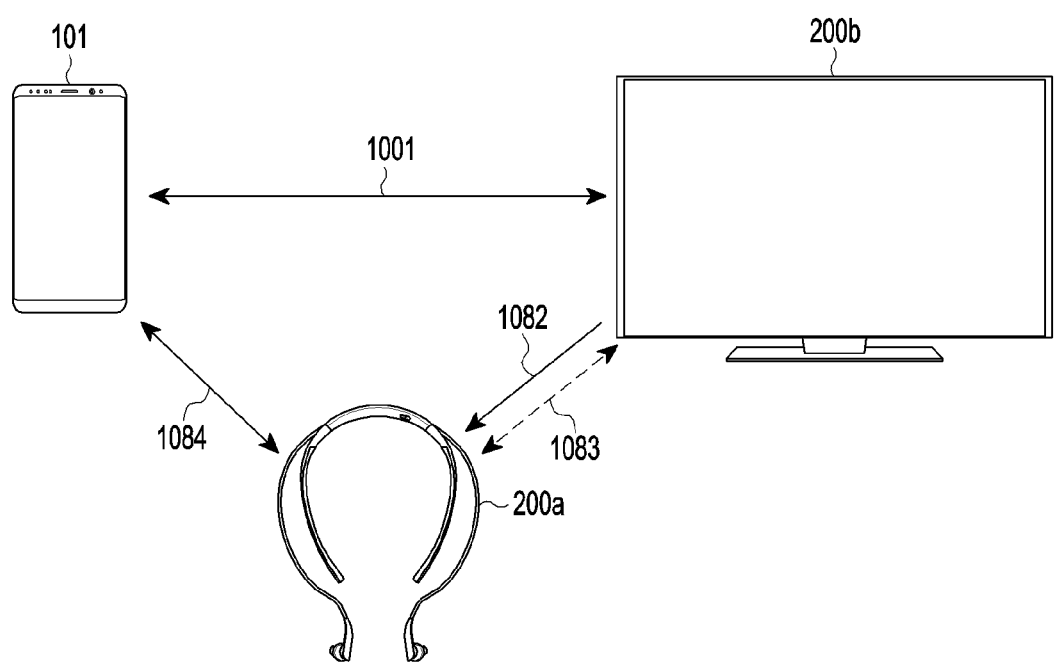
FIG. 26 illustrates a diagram for describing an operation of an electronic device according to various embodiments.

FIG. 26 illustrates a diagram of an electronic device and an external electronic device according to various embodiments.

As illustrated in FIG. 26, an electronic device 101 may establish a third communication connection 1081 with a second external electronic device 200b without passing through a server 108. The electronic device 101 may also receive information about the second external electronic device 200b through the third communication connection 1081, and may also request communication connection release between the first external electronic device 200a and the second external electronic device 200b. The second external electronic device 200b may establish a second communication connection 1082 with a first external electronic device 200a, and release (1083) the second communication connection 1082 based on received communication connection release. If it is identified through the third communication connection 1081 that the second communication connection is released, the electronic device 101 may establish a first communication connection 1084 with the first external electronic device 200a.

Figure 30:
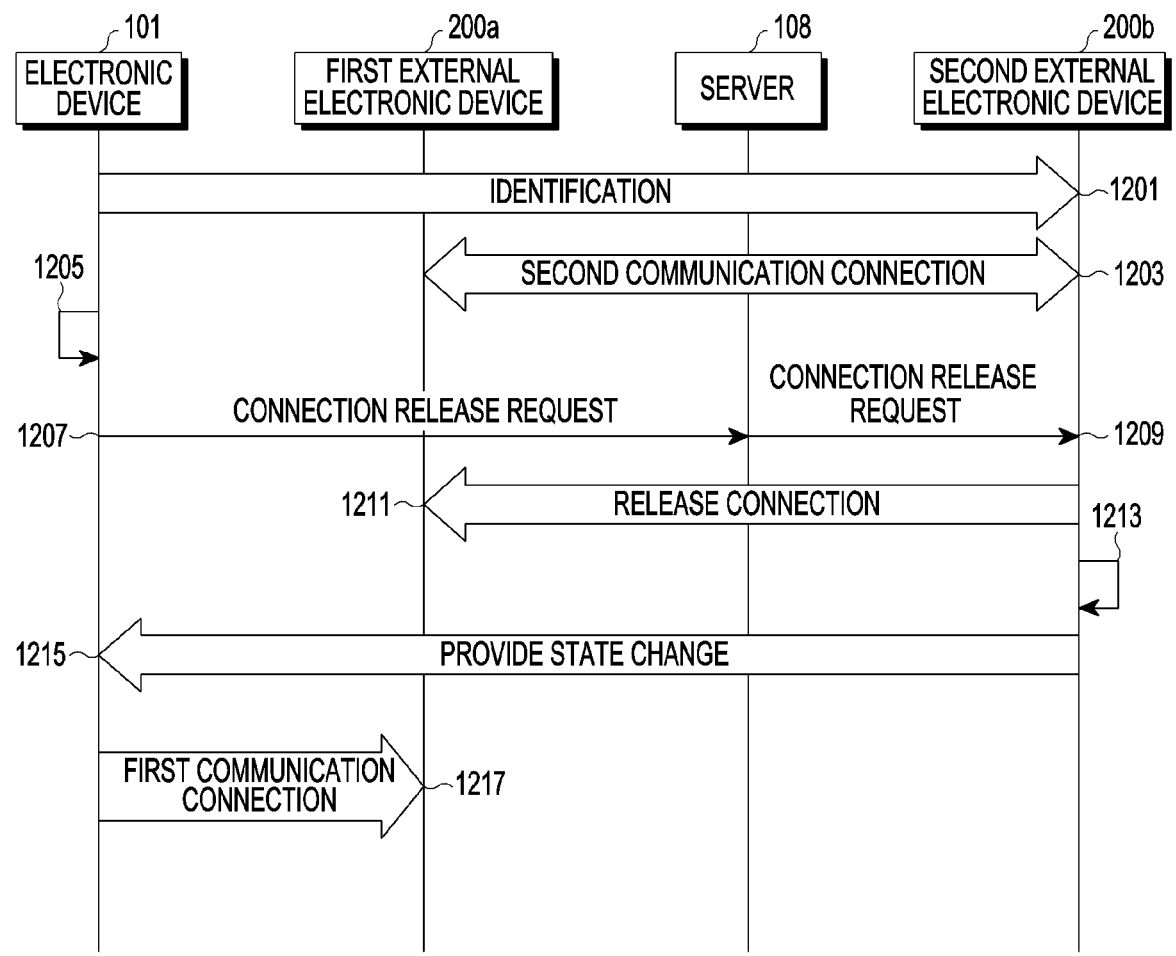
FIG. 30 illustrates a flowchart for describing an operating method of an electronic device according to various embodiments.

FIG. 30 illustrates a flowchart for describing an operating method of an electronic device according to various embodiments.

According to various embodiments, in operation 1201, an electronic device 101 (e.g., a processor 120) may identify a second external electronic device 200b. For example, the electronic device 101 may receive an advertising signal from the second external electronic device 200b, and thus, identify that the second external electronic device 200b is within a communication range. In addition, the electronic device 101 may acquire information of the second external electronic device 200b from the server 108, and a timing point of the acquisition may be variously implemented as described above. In various embodiments, as described in FIG. 25, the electronic device 101 may directly acquire, from the second external electronic device 200b, the information of the second external electronic device 200b without passing through the server 108. Although the identification operation of 1201 is illustrated as preceding operations 1203 and 1205 in the drawing, this is merely exemplary, and the identification operation of 1201 may be performed after a communication connection operation of 1203, or a connection command reception operation of 1205, which will be described in more detail later, or may be performed substantially simultaneously with the communication connection operation of 1203, or the connection command reception operation of 1205.

In operation 1203, the first external electronic device 200a and the second external electronic device 200b may establish a second communication connection. In operation 1205, the electronic device 101 may receive a connection command with the first external electronic device 200a. The electronic device 101 may display an external electronic device (e.g., the second external electronic device 200b) which is identified to be located within a communication range or a designated range. In this case, the electronic device 101 may also display information about the first external electronic device 200a connected to the second external electronic device 200b. The electronic device 101 may perform a connection operation to the first external electronic device 200a based on selection of an icon displayed in relation to the first external electronic device 200a. In operation 1207, the electronic device 101 may transmit a release request for the second communication connection to the server 108. The server 108 may transmit a release request for the second communication connection to the second external electronic device 200b in operation 1209. The second external electronic device 200b receiving a connection release request may release the second communication connection with the first external electronic device 200a in operation 1211. If release for the second communication connection is successful, the second external electronic device 200b may update state information changed in operation 1213 (for example, information indicating that the second communication connection is released). If the release for the second communication connection fails, the second external electronic device 200b may update a reason for the failure. In operation 1215, the second external electronic device 200b may provide updated information, for example, changed state information or a failure reason, to the electronic device 101 through the server 108. Here, the changed state information may include information about the release for the second communication connection between the second external electronic device 200b and the first external electronic device 200a. When the release of the second communication connection is identified, the electronic device 101 may establish a first communication connection with the first external electronic device 200a in operation 1217.

According to various embodiments, an electronic device 101 is provided, and the electronic device 101 includes a communication module 190, a processor 120 which is electrically connected to the communication module, and a memory 130 which is electrically connected to the processor 120. The memory 130 may store instructions that cause, when executed, the processor 120 to: establish a first communication connection with a first external electronic device (e.g., a first external electronic device 200a) through the communication module 190, receive, from a server 108 through the communication module 190, information related to at least one external electronic device which is registered in relation to a first user account, receive a command to connect a second external electronic device (e.g., a second external electronic device 200b) among the at least one external electronic device to the first external electronic device (e.g., the first external electronic device 200*a*), release the first communication connection with the first external electronic device (e.g., the first external electronic device 200*a*) based on the command, and transmit, to the server 108 through the communication module 190, a communication request between the second external electronic device (e.g., the second external electronic device 200*b*) and the first external electronic device (e.g., the first external electronic device 200*a*).

According to various embodiments, the electronic device 101 further includes a display device 160. As at least part of the operation of receiving the command to connect the second external electronic device (e.g., the second external electronic device 200*b*) among the at least one external electronic device to the first external electronic device (e.g., the first external electronic device 200*a*), the instructions may cause the processor 120 to display, through the display device 160, at least part of the information related to the at least one external electronic device which is registered in relation to the first user account, and receive the command to connect the second external electronic device (e.g., the second external electronic device 200*b*) to the first external electronic device (e.g., the first external electronic device 200*a*) by detecting that information which corresponds to the second external electronic device (e.g., the second external electronic device 200*b*) is selected from the displayed information related to the at least one external electronic device.

According to various embodiments, as at least part of the operation of displaying the at least part of the information related to the at least one external electronic device which is registered in relation to the first user account, the instructions may cause the processor 120 to: display, through the display device 160, at least part of information related to an external electronic device which is identified to be included in a communication range or a designated range among the at least one external electronic device which is registered in relation to the first user account.

According to various embodiments, as at least part of the operation of displaying the at least part of the information related to the at least one external electronic device which is registered in relation to the first user account, the instructions may cause the processor 120 to: display, through the display device 160, at least part of information related to an external electronic device which transmits an advertising signal among the at least one external electronic device which is registered in relation to the first user account.

According to various embodiments, the instructions may cause the processor 120 to: transmit, to the server 108, information related to the first external electronic device (e.g., the first external electronic device 200*a*) to store the information related to the first external electronic device (e.g., the first external electronic device 200*a*) in relation to the first user account upon establishing the first communication connection with the first external electronic device (e.g., the first external electronic device 200*a*) through the communication module 190.

According to various embodiments, the instructions may cause the processor 120 to: transmit, to the first external electronic device (e.g., the first external electronic device 200*a*) through the communication module 190, information about the second external electronic device (e.g., the second external electronic device 200*b*) before releasing the first communication connection.

According to various embodiments, the instructions may cause the processor 120 to: transmit, to the first external electronic device (e.g., the first external electronic device 200*a*) through the communication module 190, a command to operate in a page scan mode after the first communication connection is released before releasing the first communication connection.

According to various embodiments, the instructions may cause the processor 120 to: receive, through the communication module 190, information related to a second communication between the first external electronic device (e.g., the first external electronic device 200*a*) and the second external electronic device (e.g., the second external electronic device 200*b*), and display, through the display device 160, whether the second communication between the first external electronic device (e.g., the first external electronic device 200*a*) and the second external electronic device (e.g., the second external electronic device 200*b*) is established.

According to various embodiments, the instructions may cause the processor 120 to: display, through the display device 160, that the first external electronic device (e.g., the first external electronic device 200*a*) is connected to the second external electronic device (e.g., the second external electronic device 200*b*) upon identifying that the second communication between the first external electronic device (e.g., the first external electronic device 200*a*) and the second external electronic device (e.g., the second external electronic device 200*b*) is established, display, through the display device 160, a user interface for reconnection request for the second communication upon identifying that establishment of the second communication between the first external electronic device (e.g., the first external electronic device 200*a*) and the second external electronic device (e.g., the second external electronic device 200*b*) fails, and request, from the server 108, the second communication between the first external electronic device (e.g., the first external electronic device 200*a*) and the second external electronic device (e.g., the second external electronic device 200*b*) again upon receiving the reconnection request.

According to various embodiments, as at least part of the operation of transmitting, to the server 108, the communication request between the second external electronic device (e.g., the second external electronic device 200*b*) and the first external electronic device (e.g., the first external electronic device 200*a*), the instructions cause the processor 120 to: transmit, to the server 108, at least one of a command related to the connection, a name of the first external electronic device (e.g., the first external electronic device 200*a*), a MAC address of the first external electronic device (e.g., the first external electronic device 200*a*), a type of the first external electronic device (e.g., the first external electronic device 200*a*), some or all of advertising information of the first external electronic device (e.g., the first external electronic device 200*a*), a name of the second external electronic device (e.g., the second external electronic device 200*b*), a MAC address of the second external electronic device (e.g., the second external electronic device 200*b*), a type of the second external electronic device (e.g., the second external electronic device 200*b*), or some or all of advertising information of the second external electronic device (e.g., the second external electronic device 200*b*).

According to various embodiments, the memory 130 may store instructions that cause, when executed, the processor 120 to: receive, from the server 108 through the communication module 190, the information related to the at least one external electronic device which is registered in relation to the first user account, display that a first external electronic device (e.g., a first external electronic device 200*a*) among the at least one external electronic device establishes a second communication connection with a second external electronic device (e.g., a second external electronic device 200b) among the at least one external electronic device based on the information related to the at least one external electronic device which is registered in relation to the first user account, receive a command to connect the first external electronic device (e.g., the first external electronic device 200a) to the electronic device, transmit, to the server 108 through the communication module 190, a release request for the second communication connection between the first external electronic device (e.g., the first external electronic device 200a) and the second external electronic device (e.g., the second external electronic device 200b), establish a first communication connection with the first external electronic device (e.g., the first external electronic device 200a) upon receiving, through the communication module 190, information indicating that the second communication connection between the first external electronic device (e.g., the first external electronic device 200a) and the second external electronic device (e.g., the second external electronic device 200b) is released.

According to various embodiments, as at least part of the operation of displaying that the first external electronic device (e.g., the first external electronic device 200a) among the at least one external electronic device establishes the second communication connection with the second external electronic device (e.g., the second external electronic device 200b) among the at least one external electronic device, the instructions may cause the processor 120 to: display, through the display device 160, at least part of information related to an external electronic device which is identified to be included in a communication range or a designated range among the at least one external electronic device which is registered in relation to the first user account.

According to various embodiments, as at least part of the operation of displaying that the first external electronic device (e.g., the first external electronic device 200a) among the at least one external electronic device establishes the second communication connection with the second external electronic device (e.g., the second external electronic device 200b) among the at least one external electronic device, the instructions may cause the processor 120 to: display an object which corresponds to the first external electronic device (e.g., the first external electronic device 200a) which is connected to the server 108 through the second external electronic device (e.g., the second external electronic device 200b) among the at least one external electronic device separately from an object which corresponds to another external electronic device which is directly connected to the server 108 among the at least one external electronic device.

According to various embodiments, the instructions may cause the processor 120 to: transmit, to the server 108 through the communication module 190, at least one of information about the first communication connection or information about the first external electronic device (e.g., the first external electronic device 200a) if the first communication connection is established with the first external electronic device (e.g., the first external electronic device 200a).

According to various embodiments, the instructions may cause the processor 120 to: re-request, through the server 108, the connection release between the first external electronic device (e.g., the first external electronic device 200a) and the second external electronic device (e.g., the second external electronic device 200b) if it is identified that the second communication connection between the first external electronic device (e.g., the first external electronic device 200a) and the second external electronic device (e.g., the second external electronic device 200b) is not released.

According to various embodiments, as at least part of the operation of transmitting, to the server, the release request for the second communication connection between the first external electronic device and the second external electronic device, the instructions cause the processor to: transmit, to the server, at least one of a command related to the connection, a name of the first external electronic device, a MAC address of the first external electronic device, a type of the first external electronic device, some or all of advertising information of the first external electronic device, a name of the second external electronic device, a MAC address of the second external electronic device, a type of the second external electronic device, or some or all of advertising information of the second external electronic device.

According to various embodiments, an electronic device (e.g., a second external electronic device 200b) is provided, and the electronic device includes a communication module, a processor which is electrically connected to the communication module, and a memory which is electrically connected to the processor. The memory may store instructions that cause, when executed, the processor to: transmit, to a server 108, information about a state of the electronic device (e.g., the second external electronic device 200b) using a first user account, receive, from the server 108, a communication connection command with a first external electronic device (e.g., a first external electronic device 200a), and establish a second communication connection with the first external electronic device (e.g., the first external electronic device 200a) based on the communication connection command.

According to various embodiments, the instructions may cause the processor to transmit information about the second communication connection to the server 108 through the communication module in case that the second communication is established.

According to various embodiments, the instructions may cause the processor to: receive information about the first external electronic device (e.g., the first external electronic device 200a) as at least part of the operation of receiving, from the server 108, the communication connection command with the first external electronic device (e.g., the first external electronic device 200a), and establish the second communication connection with the first external electronic device (e.g., the first external electronic device 200a) based on the information about first external electronic device (e.g., the first external electronic device 200a) as at least part of the operation of establishing the second communication connection with the first external electronic device (e.g., the first external electronic device 200a).

According to various embodiments, the instructions may cause the processor to transmit, through the communication circuit, an advertising signal including information about the second external electronic device.

According to various embodiments, an electronic device (e.g., a second external electronic device 200b) is provided, and the electronic device (e.g., the second external electronic device 200b) may include a communication module, a processor which is electrically connected to the communication module, and a memory which is electrically connected to the processor. The memory may store instructions that cause, when executed, the processor to: establish a second communication connection with a first external electronic device (e.g., a first external electronic device 200a) through the communication module, transmit, to a server 108 through the communication module, information about a state of the electronic device using a first user account, receive, from the server 108 through the communication module, a communication connection release command with the first external electronic device (e.g., the first external electronic device 200*a*), release the second communication connection with the first external electronic device (e.g., the first external electronic device 200*a*) based on the communication connection release command, and transmit, to the server 108 through the communication module, information about the release of the second communication connection.

According to various embodiments, the electronic device (e.g., the second external electronic device 200*b*) further includes a display device, the instructions may cause the processor to: receive, from the server 108 through the communication module, information about a communication connection between the first external electronic device (e.g., the first external electronic device 200*a*) and another electronic device (e.g., an electronic device 101), and display, through the display device, that the first external electronic device (e.g., the first external electronic device 200*a*) is connected to the other electronic device (e.g., the electronic device 101).

According to various embodiments, an operating method of an electronic device is provided, and the operating method may include establishing a first communication connection with a first external electronic device (e.g., a first external electronic device 200*a*), receiving, from a server 108, information related to at least one external electronic device which is registered in relation to a first user account, receiving a command to connect a second external electronic device (e.g., a second external electronic device 200*b*) among the at least one external electronic device to the first external electronic device (e.g., the first external electronic device 200*a*), releasing the first communication connection with the first external electronic device (e.g., the first external electronic device 200*a*) based on the command, and transmitting, to the server 108, a communication request between the second external electronic device (e.g., the second external electronic device 200*b*) and the first external electronic device (e.g., the first external electronic device 200*a*).

According to various embodiments, the operation of receiving the command to connect the second external electronic device (e.g., the second external electronic device 200*b*) among the at least one external electronic device to the first external electronic device (e.g., the first external electronic device 200*a*) may include displaying at least part of the information related to the at least one external electronic device which is registered in relation to the first user account, and receiving the command to connect the second external electronic device (e.g., the second external electronic device 200*b*) to the first external electronic device (e.g., the first external electronic device 200*a*) by detecting that information which corresponds to the second external electronic device is selected from the displayed information related to the at least one external electronic device.

According to various embodiments, the operation of displaying the at least part of the information related to the at least one external electronic device which is registered in relation to the first user account may display at least part of information related to an external electronic device which is identified to be included in a communication range or a designated range among the at least one external electronic device which is registered in relation to the first user account.

According to various embodiments, the operation of displaying the at least part of the information related to the at least one external electronic device which is registered in relation to the first user account may display at least part of information related to an external electronic device which transmits an advertising signal among the at least one external electronic device which is registered in relation to the first user account.

According to various embodiments, the operating method of the electronic device may further include transmitting, to the server 108, information related to the first external electronic device (e.g., the first external electronic device 200*a*) to store the information related to the first external electronic device (e.g., the first external electronic device 200*a*) in relation to the first user account upon establishing the first communication connection with the first external electronic device (e.g., the first external electronic device 200*a*) through the communication module 190.

According to various embodiments, the operating method of the electronic device may further include transmitting, to the first external electronic device (e.g., the first external electronic device 200*a*), information about the second external electronic device (e.g., the second external electronic device 200*b*) before releasing the first communication connection.

According to various embodiments, the operating method of the electronic device may further include transmitting, to the first external electronic device (e.g., the first external electronic device 200*a*) through the communication module 190, a command to operate in a page scan mode after the first communication connection is released before releasing the first communication connection.

According to various embodiments, the operating method of the electronic device may further include receiving information related to a second communication between the first external electronic device (e.g., the first external electronic device 200*a*) and the second external electronic device (e.g., the second external electronic device 200*b*), and displaying whether the second communication between the first external electronic device (e.g., the first external electronic device 200*a*) and the second external electronic device (e.g., the second external electronic device 200*b*) is established.

According to various embodiments, the operating method of the electronic device may further include displaying that the first external electronic device (e.g., the first external electronic device 200*a*) is connected to the second external electronic device (e.g., the second external electronic device 200*b*) upon identifying that the second communication between the first external electronic device (e.g., the first external electronic device 200*a*) and the second external electronic device (e.g., the second external electronic device 200*b*) is established, display, through the display device 160, a user interface for reconnection request for the second communication upon identifying that establishment of the second communication between the first external electronic device (e.g., the first external electronic device 200*a*) and the second external electronic device (e.g., the second external electronic device 200*b*) fails, and requesting, from the server 108, the second communication between the first external electronic device (e.g., the first external electronic device 200*a*) and the second external electronic device (e.g., the second external electronic device 200*b*) again upon receiving the reconnection request.

According to various embodiments, the operation of transmitting, to the server 108, the communication request between the second external electronic device (e.g., the second external electronic device 200*b*) and the first external electronic device (e.g., the first external electronic device 200*a*) may transmit, to the server 108, at least one of a command related to the connection, a name of the first external electronic device (e.g., the first external electronic device 200a), a MAC address of the first external electronic device (e.g., the first external electronic device 200a), a type of the first external electronic device (e.g., the first external electronic device 200a), some or all of advertising information of the first external electronic device (e.g., the first external electronic device 200a), a name of the second external electronic device (e.g., the second external electronic device 200b), a MAC address of the second external electronic device (e.g., the second external electronic device 200b), a type of the second external electronic device (e.g., the second external electronic device 200b), or some or all of advertising information of the second external electronic device (e.g., the second external electronic device 200b).

According to various embodiments, the operating method of the electronic device may include receiving, from the server 108, the information related to the at least one external electronic device which is registered in relation to the first user account, displaying that a first external electronic device (e.g., a first external electronic device 200a) among the at least one external electronic device establishes a second communication connection with a second external electronic device (e.g., a second external electronic device 200b) among the at least one external electronic device based on the information the related to the at least one external electronic device which is registered in relation to the first user account, receiving a command to connect the first external electronic device (e.g., the first external electronic device 200a) to the electronic device, transmitting, to the server 108, a release request for the second communication connection between the first external electronic device (e.g., the first external electronic device 200a) and the second external electronic device (e.g., the second external electronic device 200b), establishing a first communication connection with the first external electronic device (e.g., the first external electronic device 200a) upon receiving information indicating that the second communication connection between the first external electronic device (e.g., the first external electronic device 200a) and the second external electronic device (e.g., the second external electronic device 200b) is released.

According to various embodiments, the operation of displaying that the first external electronic device (e.g., the first external electronic device 200a) among the at least one external electronic device establishes the second communication connection with the second external electronic device (e.g., the second external electronic device 200b) among the at least one external electronic device may display at least part of information related to an external electronic device which is identified to be included in a communication range or a designated range among the at least one external electronic device which is registered in relation to the first user account.

According to various embodiments, the operation of displaying that the first external electronic device (e.g., the first external electronic device 200a) among the at least one external electronic device establishes the second communication connection with the second external electronic device (e.g., the second external electronic device 200b) among the at least one external electronic device may display an object which corresponds to the first external electronic device (e.g., the first external electronic device 200a) which is connected to the server 108 through the second external electronic device (e.g., the second external electronic device 200b) among the at least one external electronic device separately from an object which corresponds to another external electronic device which is directly connected to the server 108 among the at least one external electronic device.

According to various embodiments, the operating method of the electronic device may further include transmitting, to the server 108, at least one of information about the first communication connection or information about the first external electronic device (e.g., the first external electronic device 200a) if the first communication connection is established with the first external electronic device (e.g., the first external electronic device 200a).

According to various embodiments, the operating method of the electronic device may further include re-requesting, through the server 108, the connection release between the first external electronic device (e.g., the first external electronic device 200a) and the second external electronic device (e.g., the second external electronic device 200b) if it is identified that the second communication connection between the first external electronic device (e.g., the first external electronic device 200a) and the second external electronic device (e.g., the second external electronic device 200b) is not released.

According to various embodiments, the operating method of the electronic device may further include transmitting, to the server 108, information about a state of the electronic device using a first user account, receiving, from the server 108, a communication connection command with the first external electronic device (e.g., the first external electronic device 200a), and establishing a second communication connection with the first external electronic device (e.g., the first external electronic device 200a) based on the communication connection command.

According to various embodiments, the operating method of the electronic device may further include transmitting, to the server 108, information about the second communication connection if the second communication connection is established.

According to various embodiments, the operation of receiving, from the server 108, the communication connection command with the first external electronic device (e.g., the first external electronic device 200a) may receive information about the first external electronic device (e.g., the first external electronic device 200a), and the operation of establishing the second communication connection with the first external electronic device (e.g., the first external electronic device 200a) may establish the second communication connection with the first external electronic device (e.g., the first external electronic device 200a) based on the information about the first external electronic device (e.g., the first external electronic device 200a).

According to various embodiments, the operating method of the electronic device may include establishing a second communication connection with the first external electronic device (e.g., the first external electronic device 200a), transmitting, to the server 108, information about a state of the electronic device using a first user account, receiving, from the server 108, a communication connection release command with the first external electronic device (e.g., the first external electronic device 200a), releasing the second communication connection with the first external electronic device (e.g., the first external electronic device 200a) based on the communication connection release command, and transmitting, to the server 108, information about the release of the second communication connection.

According to various embodiments, the operating method of the electronic device may further include receiving, from the server 108, information about a communication connection between the first external electronic device (e.g., the first external electronic device 200a) and another electronic device (e.g., an electronic device 101), and displaying that the first external electronic device (e.g., the first external electronic device 200a) is connected to the other electronic device (e.g., the electronic device 101).

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a communication module;
a processor which is electrically connected to the communication module; and
a memory which is electrically connected to the processor,
wherein the memory stores instructions that cause, when executed, the processor to:
establish a first communication connection with a first external electronic device through the communication module,
receive, from a server through the communication module, information related to at least one external electronic device which is registered in relation to a first user account,
receive a command to connect a second external electronic device among the at least one external electronic device to the first external electronic device,
release the first communication connection with the first external electronic device based on the command, and
transmit, to the server through the communication module, a request for establishing a second communication connection between the second external electronic device and the first external electronic device,
wherein the request includes first advertising information of the first external electronic device and second advertising information of the second external electronic device,
wherein the first advertising information includes identification information of the first external electronic device, information about whether the first external electronic device is currently paired with another device, and information about whether the first external electronic device is a device capable of pairing with a plurality of external electronic devices, and wherein the second advertising information includes identification information of the second external electronic device, information about whether the second external electronic device is currently paired with another device, and information about whether the second external electronic device is a device capable of pairing with a plurality of external electronic devices.

2. The electronic device of claim 1, further comprising:
a display device,
wherein, as at least part of the instructions that cause, when executed, the processor to receive the command to connect the second external electronic device to the first external electronic device, comprise instructions that cause, when executed, the processor to:
   display, through the display device, the information related to the at least one external electronic device which is registered in relation to the first user account, and
   receive the command to connect the second external electronic device to the first external electronic device by detecting that information which corresponds to the second external electronic device is selected from the displayed information related to the at least one external electronic device.

3. The electronic device of claim 2, wherein, as at least part of the instructions that cause, when executed, the processor to display, through the display device, the information related to the at least one external electronic device which is registered in relation to the first user account, comprise instructions that cause, when executed, the processor to:
   display, through the display device, information related to an external electronic device which is determined to be included in a range where a communication is possible or a designated range among the at least one external electronic device which is registered in relation to the first user account.

4. The electronic device of claim 2, wherein, as at least part of the instructions that cause, when executed, the processor to display, through the display device, the information related to the at least one external electronic device which is registered in relation to the first user account, comprise instructions that cause, when executed, the processor to:
   display, through the display device, the information related to an external electronic device which transmits an advertising signal among the at least one external electronic device which is registered in relation to the first user account.

5. The electronic device of claim 1, wherein the instructions cause, when executed, the processor to:
   transmit, to the server, information related to the first external electronic device to store the information related to the first external electronic device in relation to the first user account upon establishing the first communication connection with the first external electronic device through the communication module.

6. The electronic device of claim 1, wherein the instructions cause, when executed, the processor to:
   transmit, to the first external electronic device through the communication module, information related to the second external electronic device before releasing the first communication connection.

7. The electronic device of claim 1, wherein the instructions cause, when executed, the processor to:
   transmit, to the first external electronic device through the communication module, a command to operate in a scan mode after the first communication connection is released before releasing the first communication connection.

8. The electronic device of claim 1, further comprising:
a display device,
wherein the instructions cause, when executed, the processor to:
   receive, through the communication module, information related to the second communication connection between the first external electronic device and the second external electronic device, and
   display, through the display device, whether the second communication connection between the first external electronic device and the second external electronic device is established.

9. The electronic device of claim 8, wherein the instructions, when executed, cause the processor to:
   display, through the display device, that the first external electronic device is connected to the second external electronic device when an establishment of the second communication connection between the first external electronic device and the second external electronic device is identified,
   display, through the display device, a user interface for reconnection request for the second communication connection when a failure of the establishment of the second communication connection between the first external electronic device and the second external electronic device is identified, and
   transmit, to the server, the request for establishing the second communication connection between the first external electronic device and the second external electronic device again when the reconnection request is received.

10. The electronic device of claim 1, wherein, as at least part of the instructions that cause, when executed, the processor to transmit, to the server through the communication module, the request, comprise instructions that cause, when executed, the processor to:
   transmit, to the server, at least one of a command related to the second communication connection, a name of the first external electronic device, a MAC address of the first external electronic device, a type of the first external electronic device, a name of the second external electronic device, a MAC address of the second external electronic device, or a type of the second external electronic device.

* * * * *